(12) United States Patent
Nielsen et al.

(10) Patent No.: US 12,142,001 B1
(45) Date of Patent: Nov. 12, 2024

(54) SYSTEMS AND METHODS FOR DETERMINING A POSE AND MOTION OF A CARRIER VEHICLE

(71) Applicant: Hayden AI Technologies, Inc., San Francisco, CA (US)

(72) Inventors: Jerel Nielsen, Spanish Fork, UT (US); Tianxue Chen, Kirkland, WA (US); Shaocheng Wang, Mountain View, CA (US)

(73) Assignee: Hayden AI Technologies, Inc., San Francisco, CA (US)

( * ) Notice: Subject to any disclaimer, the term of this patent is extended or adjusted under 35 U.S.C. 154(b) by 0 days.

(21) Appl. No.: 18/399,159

(22) Filed: Dec. 28, 2023

(51) Int. Cl.
| | | |
|---|---|---|
| G06K 9/00 | (2022.01) | |
| G06T 7/20 | (2017.01) | |
| G06T 7/70 | (2017.01) | |
| G06V 10/44 | (2022.01) | |

(52) U.S. Cl.
CPC .................. *G06T 7/70* (2017.01); *G06T 7/20* (2013.01); *G06V 10/44* (2022.01); *G06V 2201/07* (2022.01)

(58) Field of Classification Search
CPC ... G06K 9/00; G06T 7/70; G06T 5/73; H04N 7/181
USPC ........ 382/100, 103–107, 120–123, 156, 162, 382/168, 173, 181, 199, 189, 209, 219, 382/224, 254, 274, 276, 286–291, 305, 382/312; 348/48, 113, 118, 149
See application file for complete search history.

(56) References Cited

U.S. PATENT DOCUMENTS

| | | | |
|---|---|---|---|
| 9,070,289 B2 | 6/2015 | Saund et al. | |
| 10,151,588 B1* | 12/2018 | Singh | ...................... B64D 45/00 |
| 10,295,365 B2* | 5/2019 | Scherer | ................... G01S 19/48 |
| 10,296,794 B2 | 5/2019 | Ratti | |

(Continued)

FOREIGN PATENT DOCUMENTS

| | | |
|---|---|---|
| CN | 2277104 | 3/1998 |
| CN | 106560861 | 4/2017 |

(Continued)

OTHER PUBLICATIONS

"Consulting services in Computer Vision and AI," accessed on May 8, 2023, online.

(Continued)

*Primary Examiner* — Seyed H Azarian
(74) *Attorney, Agent, or Firm* — Levine Bagade Han LLP

(57) ABSTRACT

Disclosed herein are methods and devices for determining a pose and motion of a carrier vehicle. In one aspect, a method comprises capturing video(s) of an external environment surrounding the carrier vehicle using a camera of an edge device coupled to the carrier vehicle; determining a full vehicle pose of the carrier vehicle with respect to a keyframe of the video(s) based on visual odometry measurements made using the keyframe and a subsequent video frame captured after the keyframe; determining a vehicle position and motion of the carrier vehicle based on positioning data obtained from a positioning unit of the edge device; and providing the full vehicle pose with respect to the keyframe obtained from the visual odometry measurements and the vehicle position and motion determined from the positioning data to a filter running on the edge device to obtain a fused vehicle pose and motion of the carrier vehicle.

27 Claims, 13 Drawing Sheets

(56) References Cited

U.S. PATENT DOCUMENTS

| | | | |
|---|---|---|---|
| 10,496,104 B1* | 12/2019 | Liu | G06T 5/73 |
| 10,891,497 B2* | 1/2021 | Cox | G01C 21/3848 |
| 11,003,919 B1* | 5/2021 | Ghadiok | H04N 7/181 |
| 11,164,014 B1 | 11/2021 | Ghadiok et al. | |
| 11,322,017 B1 | 5/2022 | Ghadiok et al. | |
| 11,361,558 B2 | 6/2022 | Seo | |
| 11,688,182 B2* | 6/2023 | Ghadiok | G06N 3/08 |
| | | | 382/103 |
| 2002/0072847 A1 | 6/2002 | Trajkovic et al. | |
| 2010/0081200 A1 | 4/2010 | Rajala et al. | |
| 2012/0148092 A1 | 6/2012 | Ni et al. | |
| 2013/0266188 A1 | 10/2013 | Bulan et al. | |
| 2014/0007762 A1 | 1/2014 | Gavish et al. | |
| 2014/0036076 A1 | 2/2014 | Nerayoff et al. | |
| 2014/0311456 A1 | 10/2014 | Richter et al. | |
| 2018/0172454 A1 | 6/2018 | Ghadiok et al. | |
| 2018/0240336 A1 | 8/2018 | Kareev et al. | |
| 2019/0137280 A1 | 5/2019 | Ghadiok et al. | |
| 2019/0197369 A1 | 6/2019 | Law et al. | |
| 2020/0063866 A1 | 2/2020 | Reinhart et al. | |
| 2020/0177767 A1 | 6/2020 | Kelly et al. | |
| 2020/0380270 A1 | 12/2020 | Cox et al. | |
| 2021/0166145 A1 | 6/2021 | Omari et al. | |
| 2021/0209941 A1 | 7/2021 | Maheshwari et al. | |
| 2021/0237737 A1 | 8/2021 | Al-Nuaimi et al. | |
| 2021/0241003 A1 | 8/2021 | Seo | |
| 2022/0147745 A1 | 5/2022 | Ghadiok et al. | |
| 2022/0238012 A1* | 7/2022 | Ghadiok | G08G 1/0112 |

FOREIGN PATENT DOCUMENTS

| | | |
|---|---|---|
| CN | 110197589 | 9/2019 |
| CN | 110321823 | 10/2019 |
| CN | 110717433 | 1/2020 |
| CN | 111368687 | 7/2020 |
| CN | 111492416 | 8/2020 |
| CN | 111666853 | 9/2020 |
| JP | 4805763 | 3/2008 |
| KR | 100812397 | 3/2008 |
| WO | WO 2010/081200 | 7/2010 |
| WO | WO 2014/007762 | 1/2014 |
| WO | WO 2020/063866 | 4/2020 |
| WO | WO 2020/177767 | 9/2020 |
| WO | WO 2022/099237 | 5/2022 |

OTHER PUBLICATIONS

"Safety Vision Announces Smart Automated Bus Lane Enforcement (SABLETM) Solution," *Safety Vision*, Oct. 11, 2022, online.

Bo, T. et al., "Common Phase Error Estimation in Coherent Optical OFDM Systems Using Best-fit Bounding Box," *Optics Express*, vol. 24, No. 21, pp. 73707-23718, Oct. 2016.

Bo, T. et al., "Common Phase Estimation in Coherent OFDM System Using Image Processing Technique," *IEEE Photonics Technology Letters*, vol. 27, No. 15, Aug. 2015.

Bo, T. et al., "Image Processing Based Common Phase Estimation for Coherent Optical Orthogonal Frequency Division Multiplexing System," *Optical Fiber Communication Conference*, Mar. 2015.

Canizo, M. et al. "Multi-Head CNN-RNN for multi time series anomaly detection: An industrial case study," *Neurocomputing*, 363(21), pp. 246-260, Oct. 21, 2019.

Chen, S. et al., "A Dense Feature Pyramid Network-Based Deep Learning Model for Road Marking Instance Segmentation Using MLS Point Clouds," *EEE Transactions on GeoScience and Remote Sensing*, vol. 59, No. 1, pp. 784-800, Jan. 2021.

Chhaya, S et al., "Basic Geometric Shape and Primary Colour Detection Using Image Processing On Matlab," *IJRET: International Journal of Research in Engineering and Technology*, vol. 04, Issue 05, May 2015.

Clearlane, "Automated Bus Lane Enforcement System", *SafeFleet*, 2021, online.

Clearlane, "The Safe Fleet Automated Bus Lane Enforcement (ABLE)", *SafeFleet*, 2021, online.

Evanko, K. "Siemens Mobility launches first-ever mobile bus lane enforcement solution in New York," *Siemens Mobility*, Dec. 17, 2019, Munich, Germany.

Fan, Y. et al., "A Coarse-to-Fine Framework for Multiple Pedestrian Crossing Detection," *Sensors*, vol. 20, Jul. 2020.

Franklin, R. "Traffic Signal Violation Detection using Artificial Intelligence and Deep Learning," *Department of Electronic & Telecommunication Engineering, RV College of Engineering*, pp. 839-844, accessed on Jul. 19, 2020, Karnataka, India.

Github Repository, Our Camera, <https://github.com/Bellspringsteen/OurCamera> (last visited Sep. 25, 2023).

Glenn, J., Adaptive Morphological Feature-Based Object Classifier for a Color Imaging System, *NASA Tech Briefs*, pp. 23-24, Dec. 2009.

Hsu, K., et al. "Augmented Multiple Instance Regression for Inferring Object Contours in Bounding Boxes," *IEEE Transaction on Image Processing*, vol. 23, No. 4, Apr. 2014.

Huval, B. et al. "An Empirical Evaluation of Deep Learning on Highway Driving," *Stanford University*, pp. 1-7 accessed on Apr. 17, 2015, online.

Liu, X. "Vehicle-Related Scene Understanding Using Deep Learning," *School of Engineering, Computer and Mathematical Sciences, Auckland University of Technology*, 2019, online.

Nehemiah, A. et al. "Deep Learning for Automated Driving with MATLAB," *NVIDIA Technical Blog*, <https://developer.nvidia.com/blog/deep-learning-automated-driving-matlab/> accessed on Jun. 4, 2023, online.

Novak, L., "Vehicle Detection and Pose Estimation for Autonomous Driving," Prague, May 2017.

Oh, J. et al., "Context-based Abnormal Object Detection Using the Fully-connected Conditional Random Fields," *Pattern Recognition Letters 98*, pp. 16-25, Aug. 2017.

Paquet, E. et al., "Description of shape information for 2-D and 3-D objects," *Signal Processing: Image Communication 16*, pp. 103-122, Sep. 2000.

Safe Fleet. "Whitepaper: Vendor Interoperability for ABLE," *Safe Fleet*, pp. 1-6, Apr. 2023, online.

Sengupta, S., "Semantic Mapping of Road Scenes," Oxford Brookes University, Oct. 2014.

Siemens Mobility Inc., "Ratification of Completed Procurement Actions" New York City Transit and Siemens Mobility Inc., *Finance Committee Meeting*, pp. 80-81, Mar. 2019.

Siemens Mobility Traffic Solutions, "Enforcement Solutions For Safe and Efficient Cities," *Civil Enforcement*, 2016.

Spencer, B. et al. "NYC extends Brooklyn bus lane enforcement," *ITS International*, Feb. 27, 2020, online.

Sullivan, T. "Transit Bus Surveillance Solutions," *New York City Transit/MTA Bus*, Jun. 21, 2019, Charlotte, North Carolina, USA.

Tonge, A. et al., "Traffic Rules Violation Detection using Deep Learning," *2020 4th International Conference on Electronics, Communication and Aerospace Technology (ICECA)*, pp. 1250-1257, Nov. 2020, Coimbatore, India.

Viorel, C., "Some Aspects Concerning Geometric Forms Automatically Find Images and Ordering Them Using Robot Studio Simulation," *Advanced Materials Research*, vol. 1036, pp. 760-763, Oct. 1, 2014.

Wu, C. et al. "Adjacent Lane Detection and Lateral Vehicle Distance Measurement Using Vision-Based Neuro-Fuzzy Approaches," *Journal of Applied Research and Technology*, vol. 11, pp. 251-258, Apr. 2013.

Zhao Z. et al., "Deep Reinforcement Learning Based Lane Detection and Localization," *Nerocomputing*, vol. 413, pp. 328-338, Jul. 2020.

Zhou, C. et al., "Predicting the Passenger Demand on Bus Services for Mobile Users," *Pervasive and Mobile Computing 25*, pp. 48-66, Jan. 2016.

Singh, Avi. Monocular Visual Odometry using OpenCV. Jun. 8, 2015, https://avisingh599.github.io/vision/monocular-vo/.

(56) References Cited

OTHER PUBLICATIONS

Singh, Avi. Visual Odometry from scratch—A tutorial for beginners. May 25, 2015, https://avisingh599.github.io/vision/visual-odometry-full/.

* cited by examiner

CARRIER VEHICLE 110

MUNICIPAL FLEET VEHICLE

SEMI-AUTONOMOUS VEHICLE

AUTONOMOUS VEHICLE

SYSTEMS AND METHODS FOR DETERMINING A POSE AND MOTION OF A CARRIER VEHICLE

TECHNICAL FIELD

This disclosure relates generally to the field of computer-based vehicle localization and, more specifically, to devices and methods for determining a pose and motion of a vehicle carrying a device for detecting traffic violations or tracking municipal assets.

BACKGROUND

Traffic violations and keeping track of municipal assets are significant problems for municipalities, counties, and other government entities. While some municipalities have deployed automated solutions such as automated camera or photo-based solutions and automated sensors to address these problems, such traditional photo-based solutions are often unsuited for today's fast-paced environment.

While new solutions have been deployed that utilize edge devices carried by municipal fleet vehicles to assist in traffic violation detection or asset tracking, it is often challenging to correctly determine the pose and motion of such municipal fleet vehicles at all times. While a municipal fleet vehicle can be outfitted with a satellite-based positioning receiver (e.g., Global Navigation Satellite System (GNSS) receiver), such a receiver may lose its signal when the fleet vehicle is driving in dense urban environments obstructed by structures such as tall buildings, tunnels, overpasses, etc.

To account for the deficiencies of satellite-based positioning receivers, visual odometry has been proposed as another means of determining the pose and motion of a municipal fleet vehicle. However, traditional visual odometry methods often require cumbersome initialization routines and poor visual odometry measurements may be rejected by downstream sensors. Moreover, when visual odometry measurements are made based on videos captured by a single camera (the so-called "monocular visual odometry" approach), the up-to-scale measurements produced by this approach are not of much use unless supplemented by additional information from other sensors.

Therefore, an improved solution is needed for determining a pose and motion of a carrier vehicle for traffic violation detection or asset tracking. Being able to accurately determine a pose of the carrier vehicle is important for estimating the position of offending vehicles, violation zones, and/or municipal assets. Moreover, such an improved solution should be reliable and not be overly expensive to deploy.

SUMMARY

Disclosed herein are methods and devices for determining a pose and motion of a vehicle carrying a device for detecting traffic violations or tracking municipal assets. In one aspect, a machine-based method of determining a pose and motion of a carrier vehicle is disclosed. The method can comprise capturing video(s) of an external environment surrounding a carrier vehicle using a camera of an edge device coupled to the carrier vehicle, wherein the video(s) comprise a plurality of video frames comprising a keyframe and a subsequent video frame captured after the keyframe; determining, using one or more processors of the edge device, a full vehicle pose of the carrier vehicle with respect to the keyframe based on visual odometry measurements made using the keyframe and the subsequent video frame; determining, using the one or more processors, a vehicle position and motion of the carrier vehicle based on positioning data obtained from a positioning unit of the edge device; and providing the full vehicle pose with respect to the keyframe obtained from the visual odometry measurements and the vehicle position and motion determined from the positioning data to a filter running on the edge device to obtain a fused vehicle pose and motion of the carrier vehicle, wherein the motion of the carrier vehicle comprises a velocity and acceleration of the carrier vehicle.

In another aspect, a device for determining a pose and motion of a carrier vehicle is disclosed. The device can comprise a camera configured to capture video(s) of an external environment surrounding the carrier vehicle. The device can be coupled to the carrier vehicle. The video(s) can comprise a plurality of video frames comprising a keyframe and a subsequent video frame captured after the keyframe. The device can also comprise one or more processors programmed to: determine a full vehicle pose of the carrier vehicle with respect to the keyframe based on visual odometry measurements made using the keyframe and the subsequent video frame; determine a vehicle position and motion of the carrier vehicle based on positioning data obtained from a positioning unit of the edge device; and provide the full vehicle pose with respect to the keyframe obtained from the visual odometry measurements and the vehicle position and motion determined from the positioning data to a filter running on the edge device to obtain a fused vehicle pose and motion of the carrier vehicle, wherein the motion of the carrier vehicle comprises a velocity and acceleration of the carrier vehicle.

In yet another aspect, one or more non-transitory computer-readable media are disclosed comprising instructions stored thereon, that when executed by one or more processors, cause the one or more processors to perform operations comprising: determining, using one or more processors of a control unit of the edge device, a full vehicle pose of a carrier vehicle with respect to a keyframe of a video based on visual odometry measurements made using the keyframe and a subsequent video frame of the video, wherein the video is captured by a camera of an edge device coupled to the carrier vehicle; determining a vehicle position and motion of the carrier vehicle based on positioning data obtained from a positioning unit of the edge device; and providing the full vehicle pose with respect to the keyframe obtained from the visual odometry measurements and the vehicle position and motion determined from the positioning data to a filter running on the edge device to obtain a fused vehicle pose and motion of the carrier vehicle, wherein the motion of the carrier vehicle comprises a velocity and acceleration of the carrier vehicle.

In some embodiments, the visual odometry measurements can be made by: matching image points between the keyframe and the subsequent video frame to obtain a plurality of tracked points; providing the tracked points as inputs to a random sample consensus-based (RANSAC-based) non-linear least squares solver to remove outliers and obtain an up-to-scale camera pose; determining a camera translation magnitude based on the up-to-scale camera pose using at least one of a homography-based reprojection error minimization technique, a triangulated point-based reprojection error minimization technique, and a constant depth-based reprojection error minimization technique; combining the up-to-scale camera pose and the camera translation magnitude to obtain a full camera pose; and converting the full camera pose to the full vehicle pose based on a known relationship between the full camera pose and the full vehicle pose.

In some embodiments, the method can comprise triangulating at least some of the tracked points using a triangulation algorithm and taking into account the full camera pose.

In some embodiments, the method can comprise projecting a triangulated instance of an outlier image point back into the subsequent video frame using its calculated depth and the full camera pose; and adding the outlier image point back into an inlier point set if a Sampson error of the outlier image point is within a preset threshold.

In some embodiments, matching the image points between the keyframe and the subsequent video frame can further comprise masking the keyframe using image masks based on the tracked points; detecting new image points in image areas of the keyframe outside of the image masks; matching the new image points between the keyframe and the subsequent video frame to obtain a second set of tracked points; and repeating the detecting, matching, and masking steps until a total number of tracked points exceeds a threshold amount.

In some embodiments, masking the keyframe using the image masks can further comprise centering a filled circle representing the image mask around a tracked point, wherein a radius of the filled circle is a minimum point separation parameter.

In some embodiments, the feature detector algorithm can be the FAST feature detector algorithm.

In some embodiments, the image points between the keyframe and the subsequent video frame can be matched using a pyramidal optical flow algorithm run in a forward direction. In certain embodiments, the pyramidal optical flow algorithm can be the Kanade-Lucas-Tomasi (KLT) pyramidal optical flow algorithm.

In some embodiments, the RANSAC-based nonlinear least squares solver can solve for the up-to-scale camera pose with respect to the keyframe using a camera rotation matrix and a camera translation direction as variables.

In some embodiments, the variables can be updated on their respective three degrees of freedom (3-DOF) and two degrees of freedom (2-DOF) manifolds and the cost being minimized can be an epipolar error between the tracked point in the keyframe and the tracked point in the subsequent video frame. In these embodiments, the RANSAC inlier criteria can be a Sampson distance formulated in terms of a pixel distance from an epipolar line.

In some embodiments, the fused vehicle pose and motion can further comprise a latitude of the carrier vehicle, a longitude of the carrier vehicle, an altitude of the carrier vehicle, a velocity of the carrier vehicle, an acceleration of the carrier vehicle, a vehicle rotation with respect to the keyframe, a vehicle translation with respect to the keyframe, and a vehicle heading with respect to keyframe.

In some embodiments, the homography-based reprojection error minimization technique can comprise selecting a minimum subset of tracked points from the plurality of tracked points; constructing an Euclidean homography matrix based on a rotation matrix and a translation direction from the up-to-scale camera pose, a known camera height, the camera translation magnitude, and a ground plane normal; projecting the minimum subset of tracked points between the keyframe and the subsequent video frame using the Euclidean homography matrix constructed; and another nonlinear least squares solver to solve for the camera translation magnitude and the ground plane normal such that an angular error between an expected ground plane normal and a computed ground plane normal for each of the minimum subset of tracked points is below a predefined threshold of about five degrees.

In some embodiments, the triangulated point-based reprojection error minimization technique can comprise determining the camera translation magnitude that minimizes reprojection error among all triangulated points via a nonlinear least squares solver in a consensus manner such that each triangulated point produces a solution for the camera translation magnitude and keeping the solution that best minimizes reprojection error among all triangulated points.

In some embodiments, the constant depth-based reprojection error minimization technique can comprise assuming all tracked points are at a constant fixed depth and determining the camera translation magnitude that minimizes reprojection error for the tracked points.

In some embodiments, a new instance of the keyframe can be chosen in response to an amount of tracked points falling below a tracked points threshold or a camera rotation and translation exceeding a mean pixel threshold.

DETAILED DESCRIPTION

Figure 1A:
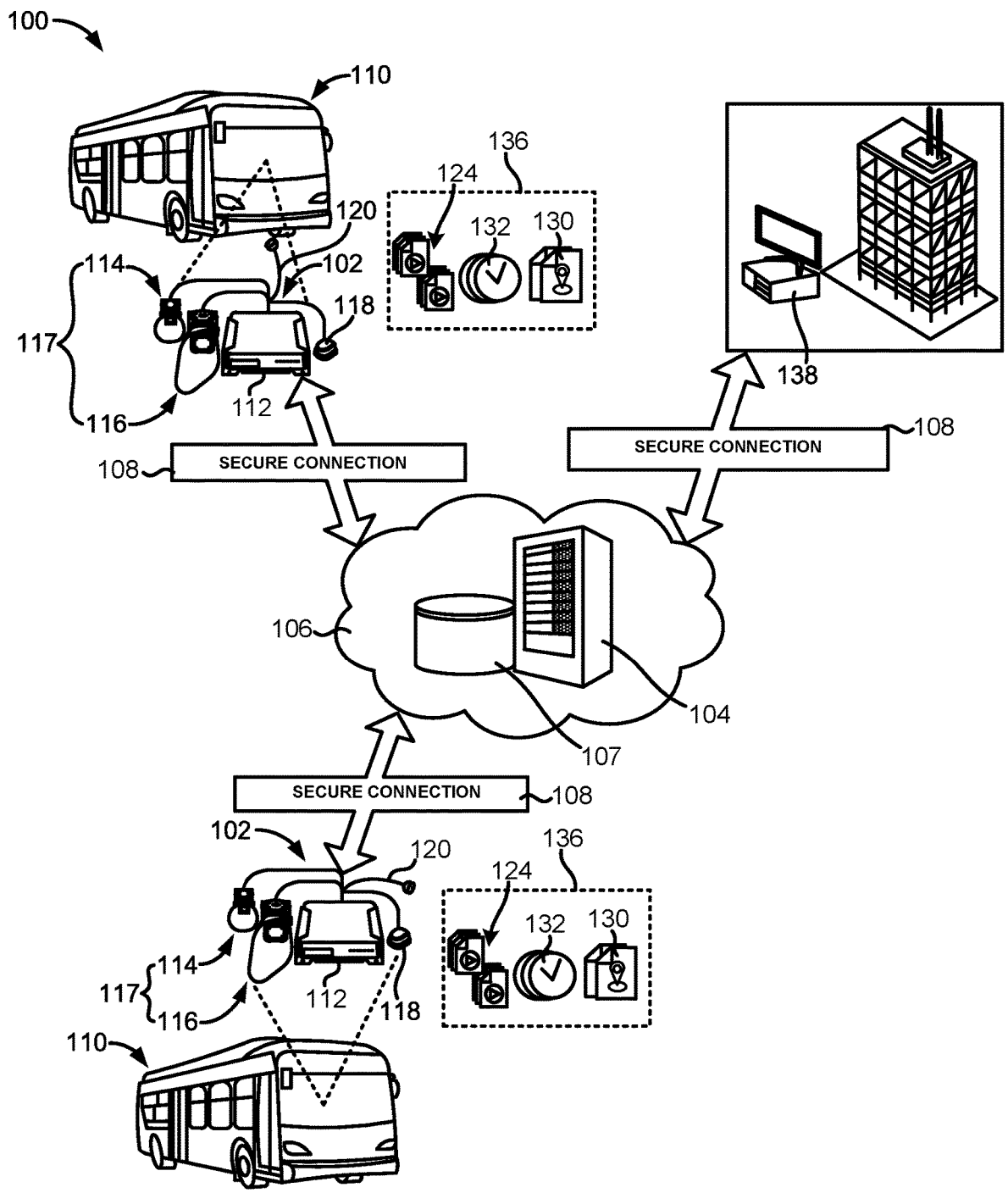
FIG. 1A illustrates one embodiment of a system for determining a pose and motion of a carrier vehicle carrying a device for detecting traffic violations or tracking municipal assets.

FIG. 1A illustrates one embodiment of a system 100 for detecting traffic violations or tracking municipal assets. The system 100 can comprise one or more edge devices 102 communicatively coupled to or in wireless communication with a server 104 in a cloud computing environment 106.

The server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more stand-alone servers such as a rack-mounted server, a blade server, a mainframe, a dedicated desktop or laptop computer, one or more processors or processor cores therein, or a combination thereof.

The edge devices 102 can communicate with the server 104 over one or more networks. In some embodiments, the networks can refer to one or more wide area networks (WANs) such as the Internet or other smaller WANs, wireless local area networks (WLANs), local area networks (LANs), wireless personal area networks (WPANs), system-area networks (SANs), metropolitan area networks (MANs), campus area networks (CANs), enterprise private networks (EPNs), virtual private networks (VPNs), multi-hop networks, or a combination thereof. The server 104 and the plurality of edge devices 102 can connect to the network using any number of wired connections (e.g., Ethernet, fiber optic cables, etc.), wireless connections established using a wireless communication protocol or standard such as a 3G wireless communication standard, a 4G wireless communication standard, a 5G wireless communication standard, a long-term evolution (LTE) wireless communication standard, a Bluetooth™ (IEEE 802.15.1) or Bluetooth™ Lower Energy (BLE) short-range communication protocol, a wireless fidelity (WiFi) (IEEE 802.11) communication protocol, an ultra-wideband (UWB) (IEEE 802.15.3) communication protocol, a ZigBee™ (IEEE 802.15.4) communication protocol, or a combination thereof.

The edge devices 102 can transmit data and files to the server 104 and receive data and files from the server 104 via secure connections 108. The secure connections 108 can be real-time bidirectional connections secured using one or more encryption protocols such as a secure sockets layer (SSL) protocol, a transport layer security (TLS) protocol, or a combination thereof. Additionally, data or packets transmitted over the secure connection 108 can be encrypted using a Secure Hash Algorithm (SHA) or another suitable encryption algorithm. Data or packets transmitted over the secure connection 108 can also be encrypted using an Advanced Encryption Standard (AES) cipher.

The server 104 can store data and files received from the edge devices 102 in at least one database 107 in the cloud computing environment 106. In some embodiments, the database 107 can be a relational database. In further embodiments, the database 107 can be a column-oriented or key-value database. In certain embodiments, the database 107 can be stored in a server memory or storage unit of the server 104. In other embodiments, the database 107 can be distributed among multiple storage nodes. In some embodiments, the database 107 can be an events database.

As will be discussed in more detail in the following sections, each of the edge devices 102 can be carried by or installed in a carrier vehicle 110 (see FIG. 1C for examples of different types of carrier vehicles 110).

For example, the edge device 102, or components thereof, can be secured or otherwise coupled to an interior of the carrier vehicle 110 immediately behind the windshield of the carrier vehicle 110.

In other embodiments, the edge device 102, or components thereof, can be secured or otherwise coupled to at least one of a windshield, window, dashboard, and deck of the carrier vehicle 110. Also, for example, the edge device 102 can be secured or otherwise coupled to at least one of a handlebar and handrail of a micro-mobility vehicle serving as the carrier vehicle 110. Alternatively, the edge device 102 can be secured or otherwise coupled to a mount or body of an unmanned aerial vehicle (UAV) or drone serving as the carrier vehicle 110.

As shown in FIG. 1A, each of the edge devices 102 can comprise a control unit 112, an event camera 114, a license plate recognition (LPR) camera 116 (the event camera 114 and the LPR camera 116 can each be individually referred to as camera 117), a communication unit, a positioning unit 118, and a vehicle bus connector 120.

In some embodiments, the communication unit and the positioning unit 118 can be combined into one unit or module. In these embodiments, any references made to the positioning unit 118 can also be considered a reference to the combined communication and positioning unit.

The event camera 114 and the LPR camera 116 of the edge device 102 can be coupled to at least one of a ceiling and headliner of the carrier vehicle 110 with the event camera 114 and the LPR camera 116 facing the windshield of the carrier vehicle 110.

The camera 117 (e.g., the event camera 114 or the LPR camera 116) can capture videos of objects (e.g., vehicles, pedestrians, buildings, landmarks, or other physical structures, etc.) near or otherwise surrounding the carrier vehicle 110. The videos captured by the camera 117 can be made up of a plurality of video frames 124.

The communication unit can comprise at least one of a cellular communication module, a WiFi communication module, a Bluetooth® communication module, and a high-precision automotive-grade positioning unit.

The positioning unit 118 can be a multi-band global navigation satellite system (GNSS) receiver configured to concurrently receive signals from a GPS satellite navigation system, a GLONASS satellite navigation system, a Galileo navigation system, and a BeiDou satellite navigation system.

The positioning unit 118 can provide positioning data 130 that can allow the edge device 102 to determine its own location at a centimeter-level accuracy. The positioning unit 118 can also provide positioning data 130 that can be used by the control unit 112 to determine a location of certain vehicles, buildings, intersections, municipal assets, etc. For example, the control unit 112 can use positioning data 130 concerning its own location to substitute for the location of the vehicles, buildings, intersections, municipal assets, etc. The control unit 112 can also use positioning data 130 concerning its own location to estimate or approximate the locations of certain vehicles, buildings, intersections, municipal assets, etc.

The edge device 102 can also comprise a vehicle bus connector 120. The vehicle bus connector 120 can allow the edge device 102 to obtain certain data from the carrier vehicle 110 carrying the edge device 102. For example, the edge device 102 can obtain wheel odometry data from a wheel odometer of the carrier vehicle 110 via the vehicle bus connector 120. Also, for example, the edge device 102 can obtain a current speed of the carrier vehicle 110 via the vehicle bus connector 120. As a more specific example, the vehicle bus connector 120 can be a J1939 connector. The edge device 102 can take into account the wheel odometry data to determine the location of certain municipal objects or assets.

The edge device 102 can also record or generate at least a plurality of timestamps 132. For example, the edge device 102 can mark the time using a global positioning system (GPS) timestamp, a Network Time Protocol (NTP) timestamp, a local timestamp based on a local clock run on the edge device 102, or a combination thereof. The edge device 102 can record the timestamps 132 from multiple sources to ensure that such timestamps 132 are synchronized with one another in order to maintain the accuracy of such timestamps 132.

As will be discussed in more detail in later sections, the edge device 102 can transmit data, information, videos, and other files to the server 104.

FIG. 1A also illustrates that the server 104 can transmit certain data and files to a third-party computing device/resource or client device 138. For example, the third-party computing device can be a server or computing resource of a municipality, another government entity, or a third-party traffic violation processor. As a more specific example, the third-party computing device can be a server or computing resource of a municipal transportation department. In other examples, the third-party computing device can be a server or computing resource of a sub-contractor responsible for processing traffic violations for a municipality or other government entity.

The client device 138 can refer to a portable or non-portable computing device. For example, the client device 138 can refer to a desktop computer or a laptop computer. In other embodiments, the client device 138 can refer to a tablet computer or smartphone.

Figure 1B:
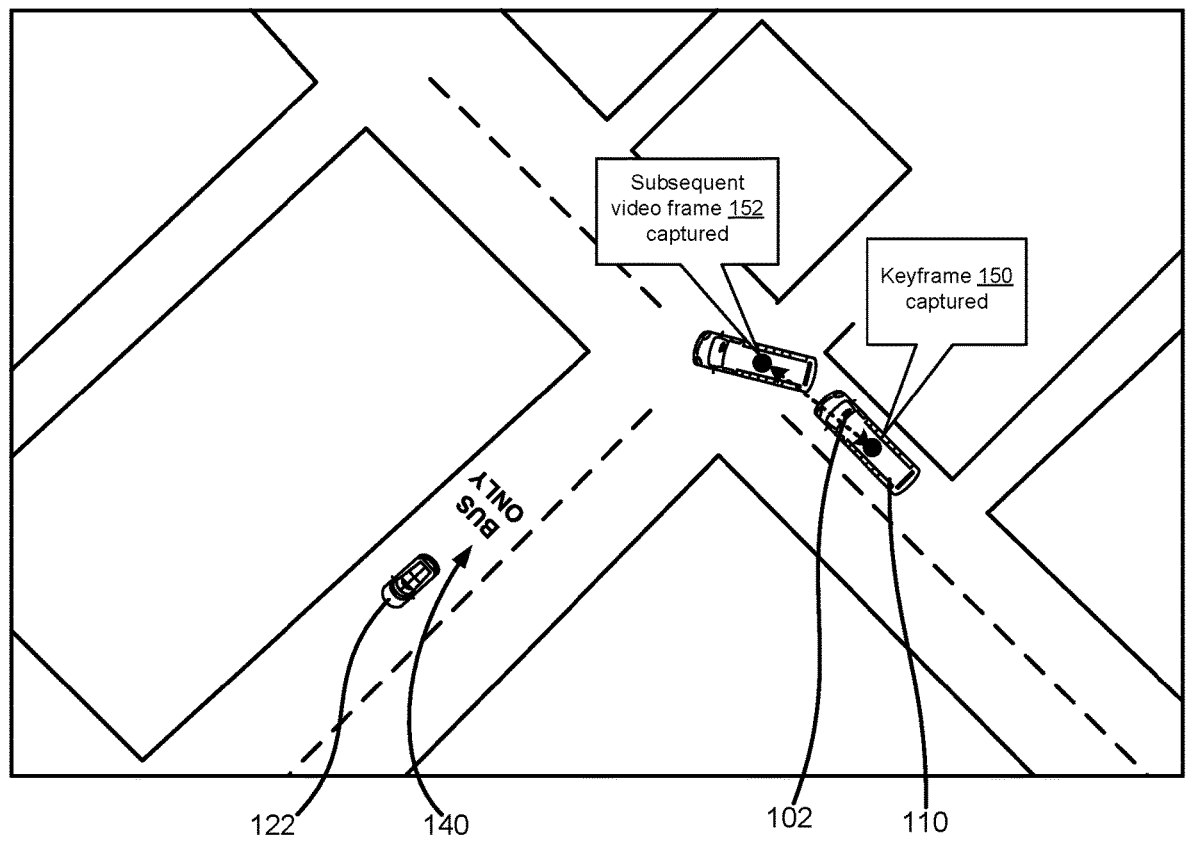
FIG. 1B illustrates an example scenario where the system can be utilized to determine the pose and motion of the carrier vehicle.

FIG. 1B illustrates an example scenario where the system 100 of FIG. 1A can be utilized to detect traffic violations such as a bus lane violation, a bike lane violation, a double-parking violation, etc. In addition to traffic violation detection, the system 100 can also be used to track municipal assets or to gather data/information concerning a municipality.

As shown in FIG. 1B, an offending vehicle 122 can be parked or otherwise stopped in a restricted road area 140. The restricted road area 140 can be a bus lane, a bike lane, a no-parking or no-stopping zone (e.g., a no-parking zone in front of a red curb or fire hydrant), a pedestrian crosswalk, or a combination thereof. In other embodiments, the restricted road area 140 can be a restricted parking spot where the offending vehicle 122 does not have the necessary credentials or authorizations to park in the parking spot. The restricted road area 140 can be marked by certain insignia, text, nearby signage, road or curb coloration, or a combination thereof.

The traffic violation can also include illegal double-parking, parking in a space where the time has expired, or parking too close to a fire hydrant.

A carrier vehicle 110 (see also, e.g., FIG. 1C) having an edge device 102 (see, e.g., FIG. 1A) mounted or installed within the carrier vehicle 110 can drive on streets or other roadways within a municipal environment while traversing its daily route (e.g., a bus route, a garbage collection route, a street cleaning route, etc.).

The edge device 102 can capture videos of an external environment surrounding the carrier vehicle 110 using one or more cameras 117 (e.g., the event camera 114, the LPR camera 116, or a combination thereof). In some embodiments, the videos can be captured monocularly or by only one camera (e.g., only the event camera 114). In other embodiments, the videos can be captured by multiple cameras (e.g., the event camera 114 and the LPR camera 116). The videos captured by the camera(s) 117 can be comprised of video frames 124.

In one embodiment, the videos can be in the MPEG-4 Part 12 or MP4 file format. In some embodiments, the videos can refer to multiple videos captured by one or more cameras 117. In other embodiments, the videos can refer to one compiled video comprising multiple videos captured by one or more cameras 117.

As shown in FIG. 1B, the video frames 124 can comprise a keyframe 150 and a subsequent video frame 152 captured after the keyframe 150. For example, the keyframe 150 can be captured at a first point in time ($t_1$) and the subsequent video frame 152 can be captured at a second point in time ($t_2$) after the first point in time ($t_1$). The subsequent video frame 152 can also be captured after the carrier vehicle 110 carrying the edge device 102 has changed its position after the keyframe 150 was captured. For example, the keyframe 150 can be captured when the carrier vehicle 110 was at a first location ($l_1$) and the subsequent video frame 152 can be captured when the carrier vehicle 110 is at a second location ($l_2$) different from the first location ($l_1$).

As will be discussed in more detail in the following sections, one or more processors of the edge device 102 can determine a full vehicle pose of the carrier vehicle 110 with respect to the keyframe 150 based on visual odometry measurements (e.g., monocular visual odometry measurements) made using the keyframe 150 and the subsequent video frame 152. The one or more processors of the edge device 102 can also determine a vehicle position and motion of the carrier vehicle 110 based on positioning data 130 (e.g., GNSS data) obtained from the positioning unit 118 of the edge device 102. The full vehicle pose with respect to the keyframe 150 obtained from the visual odometry measurements and the vehicle position and motion determined from the positioning data 130 can then be provided as inputs to a filter (e.g., an extended Kalman filter) running on the edge device 102 to obtain a fused vehicle pose and motion of the carrier vehicle 110. The fused vehicle pose and motion of the carrier vehicle 110 can be a more accurate and robust measurement of the position and motion of the carrier vehicle 110 than measurements obtained from visual odometry alone or positioning data 130 (e.g., GNSS data) alone.

In some embodiments, the videos can capture the offending vehicle 122 committing a traffic violation (e.g., a bus lane violation). In some embodiments, the one or more processors of the control unit 112 can be programmed to apply a plurality of functions from a computer vision library to the videos captured by the camera(s) 117 to extract and process video frames 124 from such videos and then pass at least some of the processed video frames 124 to a plurality of deep learning models (e.g., object detection deep learning models, lane segmentation deep learning models, etc.) running on the control unit 112 of the edge device 102.

The deep learning models can automatically identify objects and roadway lanes from the video frames 124 and classify such objects (e.g., a car, a truck, a bus, a building, a fire hydrant a pedestrian, etc.) and roadway lanes. In some embodiments, the deep learning models can also automatically identify a set of vehicle attributes, building attributes, street attributes, lane attributes, etc. For example, the offending vehicle 122 and the restricted road area 140 can be identified as part of this detection step. The control unit 112 can then determine that a traffic violation has occurred by taking into account the outputs from such deep learning models.

In order to determine whether a traffic violation has occurred, the edge device 102 needs to estimate or otherwise determine the position of such detected object(s) and roadway lane(s). One way to do this is through a triangulation procedure where tracked image points from the video frames 124 are triangulated based in part on a vehicle pose. Therefore, it is important to be able to accurately determine the vehicle pose of the carrier vehicle 110 carrying the edge device 102 in order for the edge device 102 to estimate or determine the position of offending vehicles 122, and violation zones (including the boundaries of such violation zones).

The control unit 112 can also pass certain license plate video frames captured by the LPR camera 116 to a license plate recognition engine (e.g., a license plate recognition deep learning model) running on the control unit 112 to recognize an alphanumeric string representing a license plate number of the offending vehicle 122.

In some embodiments, the control unit 112 of the edge device 102 can make an initial determination that a traffic violation has occurred and then transmit evidence of such a traffic violation to the server 104. For example, the control unit 112 can wirelessly transmit an evidence package 136 comprising at least some of the video frames 124, measurements and data concerning the position and movement of the carrier vehicle 110 (e.g., the positioning data 130), one or more timestamps 132, certain recognized vehicle attributes, and the extracted license plate number of the offending vehicle 122 to the server 104.

Each edge device 102 can be configured to continuously take videos of its surrounding environment (i.e., an environment outside of the carrier vehicle 110) as the carrier vehicle 110 traverses its usual carrier route. In these embodiments, the one or more processors of the control unit 112 of each edge device 102 can periodically transmit evidence packages 136 comprising evidence of traffic violations to the server 104.

Figure 1C:
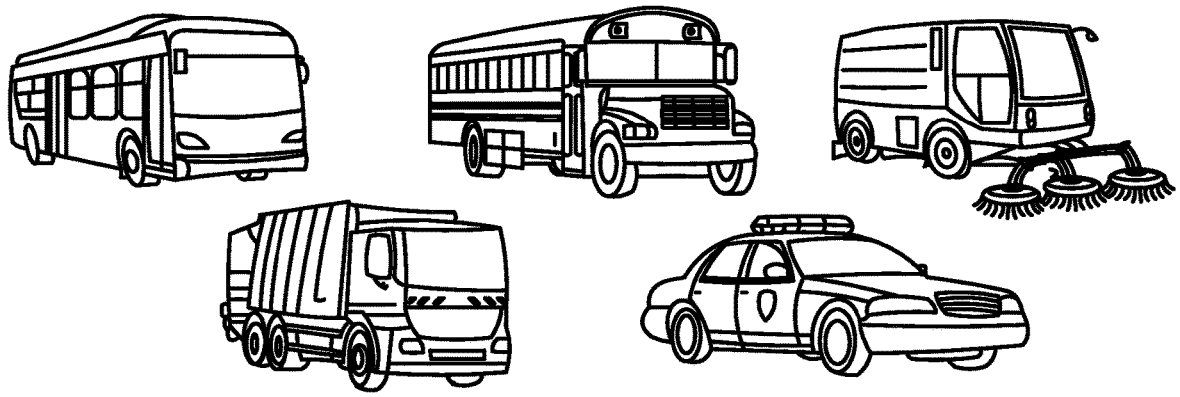
FIG. 1C illustrates different examples of carrier vehicles that can be used to carry an edge device of the system.
Figure 1C:
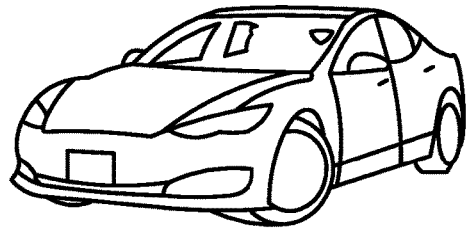
Figure 1C:
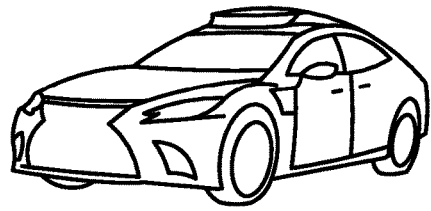

FIG. 1C illustrates that, in some embodiments, the carrier vehicle 110 can be a municipal fleet vehicle. For example, the carrier vehicle 110 can be a transit vehicle such as a municipal bus, train, or light-rail vehicle, a school bus, a street sweeper, a sanitation vehicle (e.g., a garbage truck or recycling truck), a traffic or parking enforcement vehicle, or a law enforcement vehicle (e.g., a police car or highway patrol car), a tram or light-rail train.

In other embodiments, the carrier vehicle 110 can be a semi-autonomous vehicle such as a vehicle operating in one or more self-driving modes with a human operator in the vehicle. In further embodiments, the carrier vehicle 110 can be an autonomous vehicle or self-driving vehicle.

In certain embodiments, the carrier vehicle 110 can be a private vehicle or vehicle not associated with a municipality or government entity.

In alternative embodiments, the edge device 102 can be carried by or otherwise coupled to a micro-mobility vehicle (e.g., an electric scooter). In other embodiments contemplated by this disclosure, the edge device 102 can be carried by or otherwise coupled to an unmanned aerial vehicle (UAV) or drone.

Figure 2A:
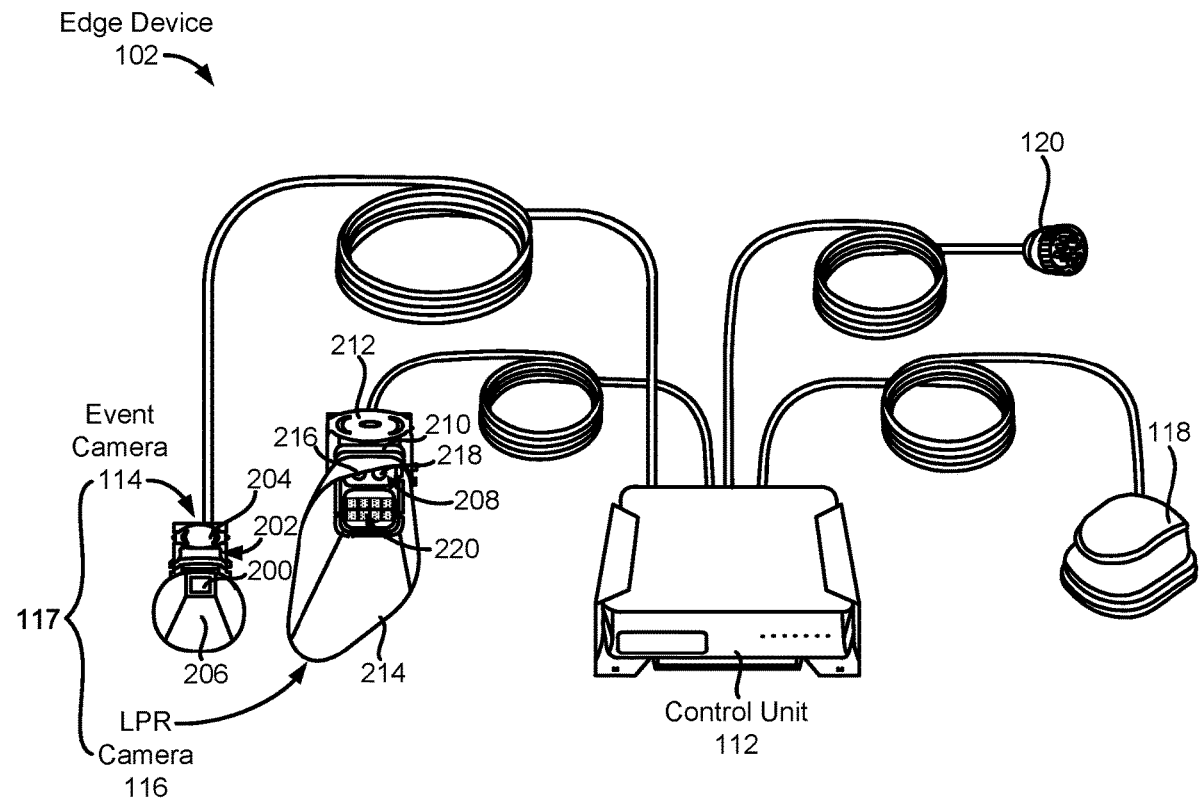
FIG. 2A illustrates one embodiment of an edge device of the system that can determine a pose and motion of the carrier vehicle used to carry the edge device.

FIG. 2A illustrates one embodiment of an edge device 102 of the system 100. The edge device 102 can be any of the edge devices disclosed herein. For purposes of this disclosure, any references to the edge device 102 can also be interpreted as a reference to a specific component, processor, module, chip, or circuitry within the edge device 102. The edge device 102 can be configured for placement behind a windshield of a carrier vehicle 110 (e.g., a fleet vehicle, see FIG. 1C).

As shown in FIG. 2A, the edge device 102 can comprise a control unit 112, an event camera 114 communicatively coupled to the control unit 112, and one or more license plate recognition (LPR) camera cameras 116 communicatively coupled to the control unit 112. The edge device 102 can further comprise a communication unit, a positioning unit 118, and a vehicle bus connector 120. The event camera 114 and the LPR camera 116 can be connected or communicatively coupled to the control unit 112 via high-speed camera interfaces such as a Mobile Industry Processor Interface (MIPI) camera serial interface. The event camera 114 and the LPR camera 116 can each be individually referred to as camera 117.

The control unit 112 can comprise a plurality of processors, memory and storage units, and inertial measurement units (IMUs). The event camera 114 and the LPR camera 116 can be coupled to the control unit 112 via high-speed buses, communication cables or wires, and/or other types of wired or wireless interfaces. The components within each of the control unit 112, the event camera 114, or the LPR camera 116 can also be connected to one another via high-speed buses, communication cables or wires, and/or other types of wired or wireless interfaces.

The processors of the control unit 112 can include one or more central processing units (CPUs), graphical processing units (GPUs), Application-Specific Integrated Circuits (ASICs), field-programmable gate arrays (FPGAs), or a combination thereof. The processors can execute software stored in the memory and storage units to execute the methods or instructions described herein.

For example, the processors can refer to one or more GPUs and CPUs of a processor module configured to perform operations or undertake calculations. As a more specific example, the processors can perform operations or undertake calculations at a terascale. In some embodiments, the processors of the control unit 112 can be configured to perform operations at between 21 teraflops (TFLOPS) up to 100 TFLOPS.

The processors of the control unit 112 can be configured to run multiple deep learning models or neural networks in parallel and process data received from the event camera 114, the LPR camera 116, or a combination thereof. More specifically, the processor module can be a Jetson Xavier NX™ module or a Jetson Orin NX™ module developed by NVIDIA Corporation. The processors can comprise at least one GPU having a plurality of processing cores (e.g., between 300 and 400 processing cores) and tensor cores, at least one CPU (e.g., at least one 64-bit CPU having multiple processing cores), and a deep learning accelerator (DLA) or other specially designed circuitry optimized for deep learning algorithms (e.g., an NVDLA™ engine developed by NVIDIA Corporation).

In some embodiments, at least part of the GPU's processing power can be utilized for object detection. In these embodiments, at least part of the DLA's processing power can be utilized for object detection and/or lane line detection. Moreover, at least part of the CPU's processing power can be used for lane line detection and/or simultaneous localization and mapping. The CPU's processing power can also be used to run other functions and maintain the operation of the edge device 102.

The memory and storage units can comprise volatile memory and non-volatile memory or storage. For example, the memory and storage units can comprise flash memory or storage such as one or more solid-state drives, dynamic random access memory (DRAM) or synchronous dynamic random access memory (SDRAM) such as low-power double data rate (LPDDR) SDRAM, and embedded multimedia controller (eMMC) storage. For example, the memory and storage units can comprise a 512 gigabyte (GB) SSD, an 8 GB 128-bit LPDDR4× memory, and 16 GB eMMC 5.1 storage device. The memory and storage units can store software, firmware, data (including video and image data), tables, logs, databases, or a combination thereof.

Each of the IMUs can comprise a 3-axis accelerometer and a 3-axis gyroscope. For example, the 3-axis accelerometer can be a 3-axis microelectromechanical system (MEMS) accelerometer and a 3-axis MEMS gyroscope. As a more specific example, the IMUs can be a low-power 6-axis IMU provided by Bosch Sensortec GmbH.

For purposes of this disclosure, any references to the edge device 102 can also be interpreted as a reference to a specific component, processor, module, chip, or circuitry within a component of the edge device 102.

The communication unit can comprise or refer to at least one of a cellular communication module, a WiFi communication module, a Bluetooth® communication module, and a high-precision automotive-grade positioning unit.

For example, the cellular communication module can support communications over a 5G network or a 4G network (e.g., a 4G long-term evolution (LTE) network) with automatic fallback to 3G networks. The cellular communication module can comprise a number of embedded SIM cards or embedded universal integrated circuit cards (eUICCs) allowing the device operator to change cellular service providers over-the-air without needing to physically change the embedded SIM cards. As a more specific example, the cellular communication module can be a 4G LTE Cat-12 cellular module.

The WiFi communication module can allow the control unit 112 to communicate over a WiFi network such as a WiFi network provided by a carrier vehicle 110, a municipality, a business, or a combination thereof. The WiFi communication module can allow the control unit 112 to communicate over one or more WiFi (IEEE 802.11) communication protocols such as the 802.11n, 802.11ac, or 802.11ax protocol.

The Bluetooth® module can allow the control unit 112 to communicate with other control units on other carrier vehicles over a Bluetooth® communication protocol (e.g., Bluetooth® basic rate/enhanced data rate (BR/EDR), a Bluetooth® low energy (BLE) communication protocol, or a combination thereof). The Bluetooth® module can support a Bluetooth® v4.2 standard or a Bluetooth v5.0 standard. In some embodiments, the wireless communication modules can comprise a combined WiFi and Bluetooth® module.

The positioning unit 118 can be a multi-band global navigation satellite system (GNSS) receiver configured to concurrently receive signals from a GPS satellite navigation system, a GLONASS satellite navigation system, a Galileo navigation system, and a BeiDou satellite navigation system. For example, the positioning unit 118 can comprise a multi-band GNSS receiver configured to concurrently receive signals from at least two satellite navigation systems including the GPS satellite navigation system, the GLONASS satellite navigation system, the Galileo navigation system, and the BeiDou satellite navigation system. In other embodiments, the positioning unit 118 can be configured to receive signals from all four of the aforementioned satellite navigation systems or three out of the four satellite navigation systems. For example, the positioning unit 118 can comprise a ZED-F9K dead reckoning module provided by u-blox holding AG.

The positioning unit 118 can provide positioning data 130 that can allow the edge device 102 to determine its own location at a centimeter-level accuracy. The positioning unit 118 can also provide positioning data 130 that can be used by the control unit 112 of the edge device 102 to estimate or otherwise calculate the location of objects (e.g., vehicles, buildings, pedestrians, municipal assets, etc.) detected from the video frames 124.

FIG. 2A also illustrates that the edge device 102 can comprise a vehicle bus connector 120 coupled to the control unit 112. The vehicle bus connector 120 can allow the control unit 112 to obtain wheel odometry data from a wheel odometer of a carrier vehicle 110 carrying the edge device 102. For example, the vehicle bus connector 120 can be a J1939 connector.

The edge device 102 can also comprise a power management integrated circuit (PMIC). The PMIC can be used to manage power from a power source. In some embodiments, the components of the edge device 102 can be powered by a portable power source such as a battery. In other embodiments, one or more components of the edge device 102 can be powered via a physical connection (e.g., a power cord) to a power outlet or direct-current (DC) auxiliary power outlet (e.g., 12V/24V) of a carrier vehicle 110 carrying the edge device 102.

The event camera 114 can comprise an event camera image sensor 200 contained within an event camera housing 202, an event camera mount 204 coupled to the event camera housing 202, and an event camera skirt 206 coupled to and protruding outwardly from a front face or front side of the event camera housing 202.

The event camera housing 202 can be made of a metallic material (e.g., aluminum), a polymeric material, or a combination thereof. The event camera mount 204 can be coupled to the lateral sides of the event camera housing 202. The event camera mount 204 can comprise a mount rack or mount plate positioned vertically above the event camera housing 202. The mount rack or mount plate of the event camera mount 204 can allow the event camera 114 to be mounted or otherwise coupled to a ceiling and/or headliner of the carrier vehicle 110. The event camera mount 204 can allow the event camera housing 202 to be mounted in such a way that a camera lens of the event camera 114 faces the windshield of the carrier vehicle 110 or is positioned substantially parallel with the windshield. This can allow the event camera 114 to take videos of an environment outside of the carrier vehicle 110 including vehicles parked or in motion near the carrier vehicle 110. The event camera mount 204 can also allow an installer to adjust a pitch/tilt and/or swivel/yaw of the event camera housing 202 to account for a tilt or curvature of the windshield.

The event camera skirt 206 can block or reduce light emanating from an interior of the carrier vehicle 110 to prevent such light from interfering with the videos captured by the event camera image sensor 200. For example, when the carrier vehicle 110 is a municipal bus, the interior of the municipal bus is often lit by artificial lights (e.g., fluorescent lights, LED lights, etc.) to ensure passenger safety. The event camera skirt 206 can block or reduce the amount of artificial light that reaches the event camera image sensor 200 to prevent this light from degrading the videos captured by the event camera image sensor 200. The event camera skirt 206 can be designed to have a tapered or narrowed end and a wide flared end. The tapered end of the event camera skirt 206 can be coupled to a front portion or front face/side of the event camera housing 202. The event camera skirt 206 can also comprise a skirt distal edge defining the wide flared end. In some embodiments, the event camera 114 can be mounted or otherwise coupled in such a way that the skirt distal edge of the event camera skirt 206 is separated from the windshield of the carrier vehicle 110 by a separation distance. In some embodiments, the separation distance can be between about 1.0 cm and 10.0 cm.

In some embodiments, the event camera skirt 206 can be made of a dark-colored non-transparent polymeric material. In certain embodiments, the event camera skirt 206 can be made of a non-reflective material. As a more specific example, the event camera skirt 206 can be made of a dark-colored thermoplastic elastomer such as thermoplastic polyurethane (TPU).

The event camera image sensor 200 can be configured to capture video at a frame rate of between 15 frames per second and up to 60 frames per second (FPS). For example, the event camera image sensor 200 can be a high-dynamic range (HDR) image sensor. The event camera image sensor 200 can capture video images at a minimum resolution of 1920×1080 (or 2 megapixels). As a more specific example, the event camera image sensor 200 can comprise one or more CMOS image sensors provided by OMNIVISION Technologies, Inc.

The event camera 114 can capture videos of an environment outside of the carrier vehicle 110, including any vehicles parked or in motion near the carrier vehicle 110, as the carrier vehicle 110 traverses its usual carrier route. The control unit 112 can be programmed to apply a plurality of functions from a computer vision library to the videos to read video frames 124 from the videos and pass the video frames 124 to a plurality of deep learning models (e.g., neural networks) run on the control unit 112.

As shown in FIG. 2A, the edge device 102 can also comprise an LPR camera 116. The LPR camera 116 can comprise at least two LPR image sensors 208 contained within an LPR camera housing 210, an LPR camera mount 212, coupled to the LPR camera housing 210, and an LPR camera skirt 214 coupled to and protruding outwardly from a front face or front side of the LPR camera housing 210.

The LPR camera housing 210 can be made of a metallic material (e.g., aluminum), a polymeric material, or a combination thereof. The LPR camera mount 212 can be coupled to the lateral sides of the LPR camera housing 210. The LPR camera mount 212 can comprise a mount rack or mount plate positioned vertically above the LPR camera housing 210. The mount rack or mount plate of the LPR camera mount 212 can allow the LPR camera 116 to be mounted or otherwise coupled to a ceiling and/or headliner of the carrier vehicle 110. The LPR camera mount 212 can also allow an installer to adjust a pitch/tilt and/or swivel/yaw of the LPR camera housing 210 to account for a tilt or curvature of the windshield.

The LPR camera mount 212 can allow the LPR camera housing 210 to be mounted in such a way that the LPR camera 116 faces the windshield of the carrier vehicle 110 at an angle. This can allow the LPR camera 116 to capture videos of license plates of vehicles 122 directly in front of or on one side (e.g., a right side or left side) of the carrier vehicle 110.

The LPR camera 116 can comprise a daytime image sensor 216 and a nighttime image sensor 218. The daytime image sensor 216 can be configured to capture images or videos in the daytime or when sunlight is present. Moreover, the daytime image sensor 216 can be an image sensor configured to capture images or videos in the visible spectrum.

The nighttime image sensor 218 can be an infrared (IR) or near-infrared (NIR) image sensor configured to capture images or videos in low-light conditions or at nighttime.

In certain embodiments, the daytime image sensor 216 can comprise a CMOS image sensor manufactured or distributed by OmniVision Technologies, Inc. For example, the daytime image sensor 216 can be the OmniVision OV2311 CMOS image sensor configured to capture videos between 15 FPS and 60 FPS.

The nighttime image sensor 218 can comprise an IR or NIR image sensor manufactured or distributed by OmniVision Technologies, Inc.

In other embodiments not shown in the figures, the LPR camera 116 can comprise one image sensor with both daytime and nighttime capture capabilities. For example, the LPR camera 116 can comprise one RGB-IR image sensor.

The LPR camera can also comprise a plurality of IR or NIR light-emitting diodes (LEDs) 220 configured to emit IR or NIR light to illuminate an event scene in low-light or nighttime conditions. In some embodiments, the IR/NIR LEDs 220 can be arranged as an IR/NIR light array (see FIG. 2A).

The IR LEDs 220 can emit light in the infrared or near-infrared (NIR) range (e.g., about 800 nm to about 1400 nm) and act as an IR or NIR spotlight to illuminate a nighttime environment or low-light environment immediately outside of the carrier vehicle 110. In some embodiments, the IR LEDs 220 can be arranged as a circle or in a pattern surrounding or partially surrounding the nighttime image sensor 218. In other embodiments, the IR LEDs 220 can be arranged in a rectangular pattern, an oval pattern, and/or a triangular pattern around the nighttime image sensor 218.

In additional embodiments, the LPR camera 116 can comprise a nighttime image sensor 218 (e.g., an IR or NIR image sensor) positioned in between two IR LEDs 220. In these embodiments, one IR LED 220 can be positioned on one lateral side of the nighttime image sensor 218 and the other IR LED 220 can be positioned on the other lateral side of the nighttime image sensor 218.

In certain embodiments, the LPR camera 116 can comprise between 3 and 12 IR LEDs 220. In other embodiments, the LPR camera 116 can comprise between 12 and 20 IR LEDs.

In some embodiments, the IR LEDs 220 can be covered by an IR bandpass filter. The IR bandpass filter can allow only radiation in the IR range or NIR range (between about 780 nm to about 1500 nm) to pass while blocking light in the visible spectrum (between about 380 nm to about 700 nm). In some embodiments, the IR bandpass filter can be an optical-grade polymer-based filter or a piece of high-quality polished glass. For example, the IR bandpass filter can be made of an acrylic material (optical-grade acrylic) such as an infrared transmitting acrylic sheet. As a more specific example, the IR bandpass filter can be a piece of poly (methyl methacrylate) (PMMA) (e.g., Plexiglass™) that covers the IR LEDs 220.

In some embodiments, the LPR camera skirt 214 can be made of a dark-colored non-transparent polymeric material. In certain embodiments, the LPR camera skirt 214 can be made of a polymeric material. For example, the LPR camera skirt 214 can be made of a non-reflective material. As a more specific example, the LPR camera skirt 214 can be made of a dark-colored thermoplastic elastomer such as thermoplastic polyurethane (TPU).

Although FIG. 2A illustrates an embodiment of the LPR camera 116 with only one LPR camera skirt 214, it is contemplated by this disclosure that the LPR camera 116 can comprise an outer LPR camera skirt and an inner LPR camera skirt. The inner LPR camera skirt can block IR light reflected by the windshield of the carrier vehicle 110 that can interfere with the videos captured by the nighttime image sensor 218.

The LPR camera skirt 214 can comprise a first skirt lateral side, a second skirt lateral side, a skirt upper side, and a skirt lower side. The first skirt lateral side can have a first skirt lateral side length. The second skirt lateral side can have a second skirt lateral side length. In some embodiments, the first skirt lateral side length can be greater than the second skirt lateral side length such that the first skirt lateral side protrudes out further than the second skirt lateral side. In these and other embodiments, any of the first skirt lateral side length or the second skirt lateral side length can vary along a width of the first skirt lateral side or along a width of the second skirt lateral side, respectively. However, in all such embodiments, a maximum length or height of the first skirt lateral side is greater than a maximum length or height of the second skirt lateral side. In further embodiments, a minimum length or height of the first skirt lateral side is greater than a minimum length or height of the second skirt lateral side. The skirt upper side can have a skirt upper side length or a skirt upper side height. The skirt lower side can have a skirt lower side length or a skirt lower side height. In some embodiments, the skirt lower side length or skirt lower side height can be greater than the skirt upper side length or the skirt upper side height such that the skirt lower side protrudes out further than the skirt upper side. The unique design of the LPR camera skirt 214 can allow the LPR camera 116 to be positioned at an angle with respect to a windshield of the carrier vehicle 110 but still allow the LPR camera skirt 214 to block light emanating from an interior of the carrier vehicle 110 or block light from interfering with the image sensors of the LPR camera 116.

Figure 2B:
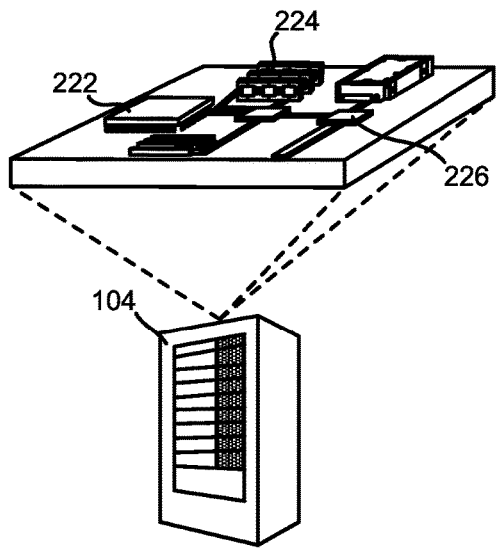
FIG. 2B illustrates one embodiment of a server of the system.

FIG. 2B illustrates one embodiment of the server 104 of the system 100. As previously discussed, the server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more physical servers or dedicated computing resources or nodes such as a rack-mounted server, a blade server, a mainframe, a dedicated desktop or laptop computer, one or more processors or processors cores therein, or a combination thereof.

For purposes of the present disclosure, any references to the server 104 can also be interpreted as a reference to a specific component, processor, module, chip, or circuitry within the server 104.

For example, the server 104 can comprise one or more server processors 222, server memory and storage units 224, and a server communication interface 226. The server processors 222 can be coupled to the server memory and storage units 224 and the server communication interface 226 through high-speed buses or interfaces.

The one or more server processors 222 can comprise one or more CPUs, GPUs, ASICs, FPGAs, or a combination thereof. The one or more server processors 222 can execute software stored in the server memory and storage units 224 to execute the methods or instructions described herein. The one or more server processors 222 can be embedded processors, processor cores, microprocessors, logic circuits, hardware FSMs, DSPs, or a combination thereof. As a more specific example, at least one of the server processors 222 can be a 64-bit processor.

The server memory and storage units 224 can store software, data (including video or image data), tables, logs, databases, or a combination thereof. The server memory and storage units 224 can comprise an internal memory and/or an external memory, such as a memory residing on a storage node or a storage server. The server memory and storage units 224 can be a volatile memory or a non-volatile memory. For example, the server memory and storage units 224 can comprise nonvolatile storage such as NVRAM, Flash memory, solid-state drives, hard disk drives, and volatile storage such as SRAM, DRAM, or SDRAM.

The server communication interface 226 can refer to one or more wired and/or wireless communication interfaces or modules. For example, the server communication interface 226 can be a network interface card. The server communication interface 226 can comprise or refer to at least one of a WiFi communication module, a cellular communication module (e.g., a 4G or 5G cellular communication module), and a Bluetooth®/BLE or other type of short-range communication module. The server 104 can connect to or communicatively couple with each of the edge devices 102 via the server communication interface 226. The server 104 can transmit or receive packets of data using the server communication interface 226.

Figure 2C:
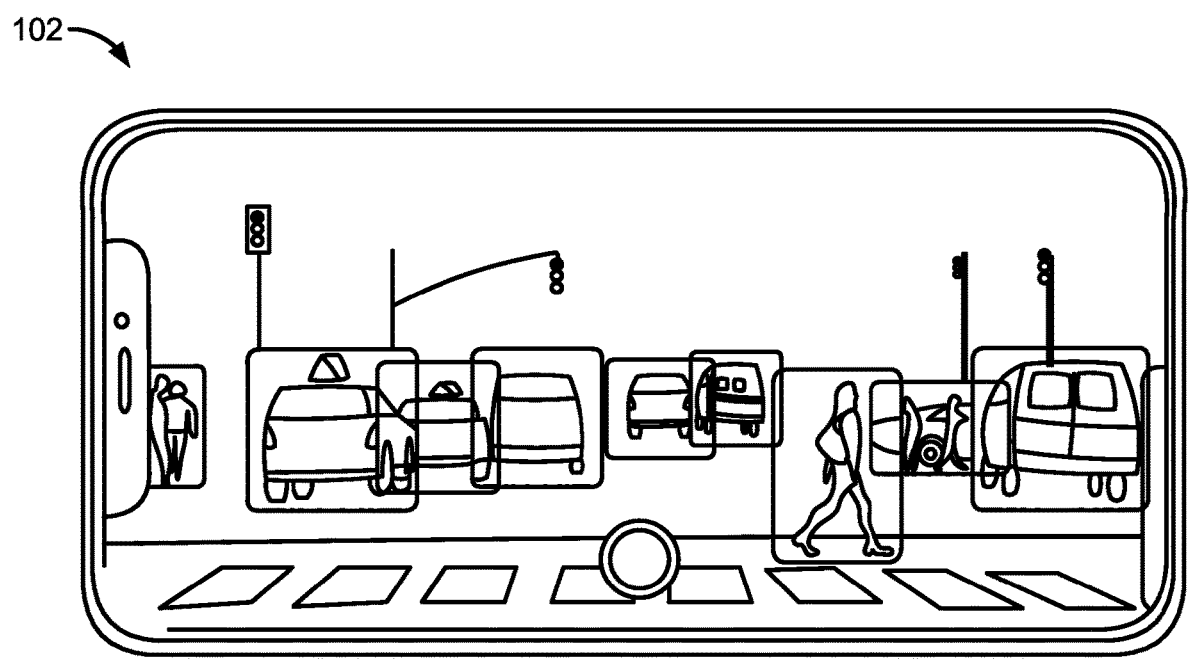
FIG. 2C illustrates another embodiment of the edge device as a personal communication device.

FIG. 2C illustrates an alternative embodiment of the edge device 102 where the edge device 102 is a personal communication device such as a smartphone or tablet computer. In this embodiment, the event camera 114 and the LPR camera 116 of the edge device 102 can be the built-in cameras or image sensors of the smartphone or tablet computer. Moreover, references to the one or more processors, the memory and storage units, the communication unit, the positioning unit 118, and the IMUs of the edge device 102 can refer to the same or similar components within the smartphone or tablet computer.

Also, in this embodiment, the smartphone or tablet computer serving as the edge device 102 can also wirelessly communicate or be communicatively coupled to the server 104 via the secure connection 108. The smartphone or tablet computer can also be positioned near a windshield or window of a carrier vehicle 110 via a phone or tablet holder coupled to the ceiling/headliner, windshield, window, console, and/or dashboard of the carrier vehicle 110.

Software instructions run on the edge device 102, including any of the engines and modules disclosed herein, can be written in the Java® programming language, C++ programming language, the Python® programming language, the Golang™ programming language, or a combination thereof.

Figure 3:
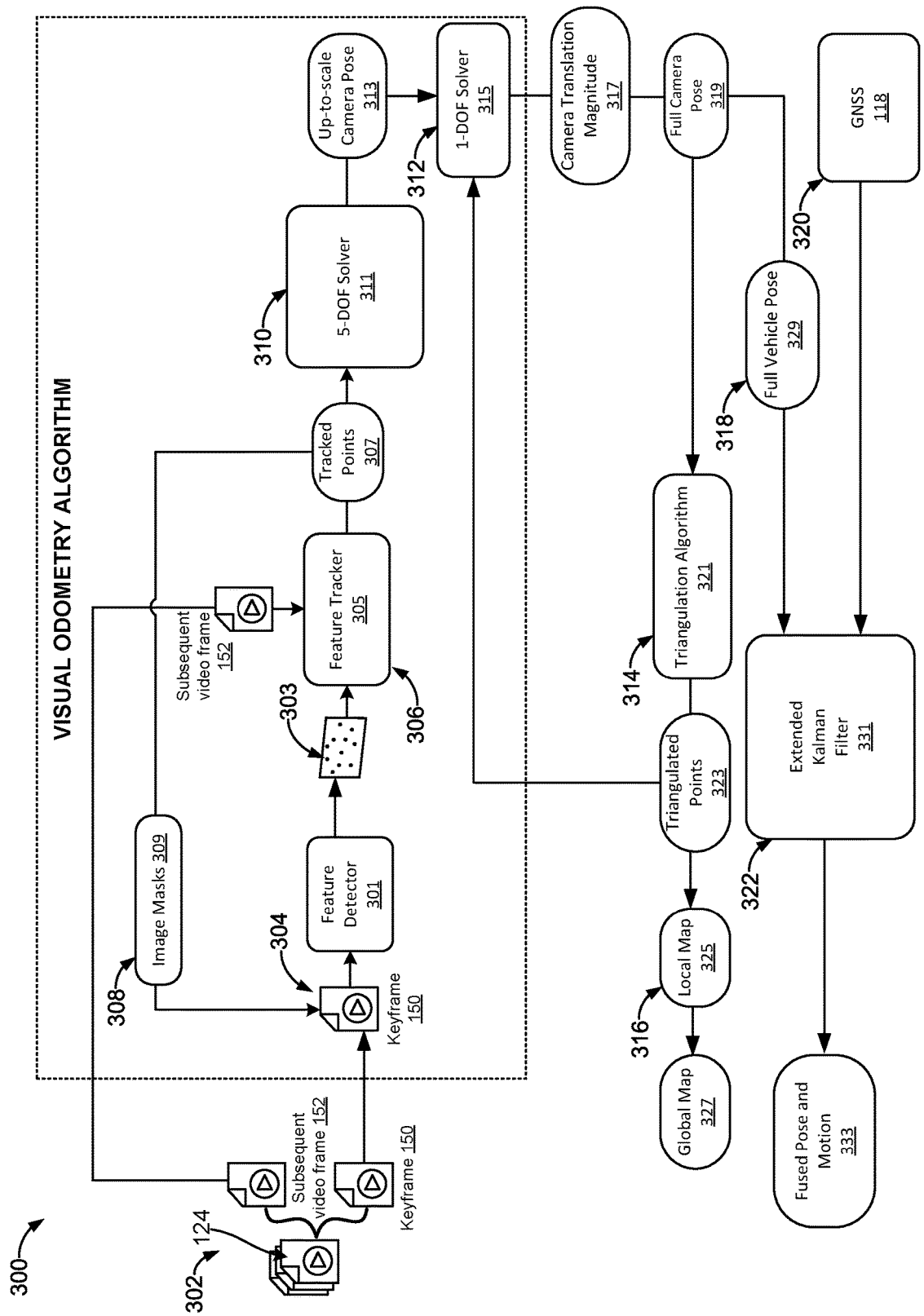
FIG. 3 illustrates one embodiment of a method of determining the pose and motion of the carrier vehicle.

FIG. 3 illustrates certain steps of a method 300 for determining a pose and motion of a carrier vehicle 110 carrying an edge device 102. In some embodiments, at least part of the method 300 can be undertaken by one or more processors of the control unit 112.

The method 300 can comprise capturing a video or images of an external environment surrounding the carrier vehicle using a camera 117 of the edge device 102 (see, e.g., FIG. 1A or FIG. 2A) coupled to the carrier vehicle 110 in step 302.

In some embodiments, the video(s) or image(s) are captured by a singular camera 117 of the edge device 102 such that certain steps of the method 300 can be considered part of a monocular visual odometry algorithm.

In some embodiments, the camera 117 can be the event camera 114. In other embodiments, the camera 117 can be the LPR camera 116.

The video can comprise a plurality of video frames 124. The video frames 124 can comprise a keyframe 150 and a subsequent video frame 152 captured after the keyframe 150 (see also, e.g., FIG. 1B).

In alternative embodiments, the camera 117 can capture a plurality of images in rapid succession. In these embodiments, the keyframe 150 and the subsequent video frame 152 can refer to images captured by the camera 117.

The camera 117 can be positioned and oriented in a specific manner when capturing the keyframe 150. The position and orientation of the camera 117 can be referred to as a camera pose. The position and orientation of the camera 117 when capturing the keyframe 150 can be referred to as a keyframe pose. The keyframe pose can act as an anchor or origin point that can be used to measure a change in orientation and/or translation of the camera 117. For example, the camera pose can change in response to a movement of the carrier vehicle 110 (e.g., translation and/or rotation of the carrier vehicle 110). The keyframe pose can be compared against the camera pose in a subsequent video frame 152 (a video frame captured subsequent to the keyframe 150) to determine the change in orientation and/or translation of the camera 117.

In some embodiments, the first keyframe 150 selected can be the first video frame captured by the camera 117 as part of a video or video recording. In other embodiments, the first keyframe 150 selected can be the first image captured by the camera 117 in a series of images. In additional embodiments, the first keyframe 150 selected can be a video frame captured by the camera 117 that is close in time to the first video frame but not the first video frame. As will be discussed in more detail in later sections, a new keyframe 150 can be selected if a number of tracked points falls below a point threshold or if a threshold for camera translation and rotation has been met.

The keyframe 150 can be provided as an input to a feature detector 301 running on the edge device 102 to detect image points 303 or features in the keyframe 150 in step 304. In some embodiments, the feature detector 301 can be the Features from Accelerated Segment Test (FAST) detection algorithm.

In other embodiments, the feature detector 301 can be any of the Harris detection algorithm (a combined corner and edge detector), the Scale Invariant Feature Transform (SIFT) (based on a maxima or minima of a Difference-of-Gaussian (DoG) function applied in a scaled space to generate a local feature vector that represents an image as one parameter), or the Speeded-Up Robust Features (SURF) detector (based on a Hessian matrix (Fast Hessian) and sums of 2D Haar wavelet responses).

The method 300 can further comprise using a feature tracker 305 to match the image points 303 or features detected in the keyframe 150 to similar points in the subsequent video frame 152 in step 306. These matched points can be referred to as tracked points 307 since these points are tracked from the keyframe 150 to the subsequent video frame 152 (see also, e.g., FIG. 4A).

The method 300 can also comprise masking the keyframe 150 using a plurality of image masks 309 based on the tracked points 307 in step 308. Step 308 can also comprise detecting new image points 303 in image areas of the keyframe 150 outside of the image masks 309 and matching the new image points 303 between the keyframe 150 and the subsequent video frame 152 to obtain a further set of tracked points 307. The further set of tracked points 307 can be obtained using the same feature tracker 305 used to obtain the initial set of tracked points 307.

Step 308 can also comprise repeating the detecting, matching, and masking steps until a total number of tracked points 307 exceeds a threshold amount. In some embodiments, the threshold amount can comprise between 50 and 500 tracked points 307 (e.g., 50 tracked points, 100 tracked points, 200 tracked points, 300 tracked points, 400 tracked points, or 500 tracked points).

In alternative embodiments, the threshold amount can comprise between 500 and 1,000 tracked points 307. The maximum threshold amount can be based on the minimum point separation parameter used for image masking.

The detector threshold of the feature detector 301 (e.g., the FAST detection algorithm) can be automatically adjusted based on the total number of tracked points 307. The detector threshold (e.g., the FAST detector threshold) can be automatically lowered when fewer than 200 tracked points are detected and the detector threshold can be automatically raised when more than 500 tracked points are detected.

In some embodiments, the feature tracker 305 can be a pyramidal optical flow algorithm. For example, the pyramidal optical flow algorithm can be the Kanade-Lucas-Tomasi (KLT) pyramidal optical flow algorithm.

Although the feature tracker 305 (e.g., the pyramidal optical flow algorithm) can be run in both a forward and backward direction to filter points, the feature tracker 305 is only run in the forward direction in this instance. This is done to save computational resources and because the subsequent steps of the method 300 can be used to remove poorly matched points or outliers.

In some embodiments, masking the keyframe 150 using the image masks 309 can comprise centering a filled circle 400 (see, e.g., FIG. 4B) representing the image mask 309 around a tracked point 307. The radius of the filled circle 400 can be a minimum point separation distance or parameter. The filled circle 400 representing the image mask 309 informs the feature detector 301 where to detect or not detect the image points 303. This is done in order to conserve computational resources that would otherwise be wasted on detecting image points 303 near other previously detected image points 303. This also ensures that a good distribution of image points 303 are detected.

The method 300 can also comprise selecting a new instance of the keyframe 150: (i) if the number of tracked points 307 falls below a point threshold or (ii) if a threshold for camera translation and rotation has been met. If any of these conditions are met, a new keyframe 150 is selected and the detecting, matching, and masking steps are repeated with this new keyframe 150 and a subsequent video frame 152 captured after the new keyframe 150.

In some embodiments, the point threshold can be between about 50 tracked points 307 and 100 tracked points 307. In other embodiments, the point threshold can be between about 30 tracked points 307 and 50 tracked points 307. In further embodiments, the point threshold can be between about 100 tracked points 307 and 200 tracked points 307.

In some embodiments, the threshold for camera translation and rotation can be an average pixel motion set to about 30 pixels. A new instance of the keyframe 150 can be selected if the average pixel motion exceeds 30 pixels. The average pixel motion can be computed after all other calculations to ensure all outlier points have been removed.

The method 300 can further comprise providing the tracked points 307 as inputs to a five degrees-of-freedom (5-DOF) solver 311 to remove outlier points and to obtain an up-to-scale camera pose 313 (also referred to as a scaled camera pose) in step 310. The up-to-scale camera pose 313 can be calculated with respect to the keyframe 150. The term "up-to-scale" means that the magnitude of the translation is unknown at this point and the translation direction is only provided as a unit length vector.

In some embodiments, the 5-DOF solver 311 can be a random sample consensus-based (RANSAC-based) nonlinear least squares solver. The 5-DOF solver 311 can solve for the up-to-scale camera pose 313 which can comprise a camera rotation matrix, R, and a camera translation direction, t. The solver is a 5-DOF solver because the variables being solved for or optimized are camera rotation in three degrees of freedom (3-DOF) and camera translation direction in two degrees of freedom (2-DOF). These variable are updated on their respective 3-DOF (camera rotation) and 2-DOF (camera translation direction) manifolds to decrease solver calculation times and improve robustness. The 5-DOF solver 311 utilizing nonlinear least squares optimization is also computationally efficient and enables a CPU only solution if GPU resources are not made available.

Camera rotation and camera translation direction are selected as the variables for the 5-DOF solver 311 because they decrease the number of required optimization steps and greatly increase the probability of obtaining the correct relative orientation and unit translation, independent of scale. They also automatically initialize the visual odometry algorithm.

The cost being minimized is the standard epipolar error between two tracked points 307 and the RANSAC inlier criteria is the Sampson distance formulated in terms of pixel distance from the epipolar line.

The camera rotation and camera translation direction are each modeled mathematically using Lie group theory. A manifold is the Euclidean space related to such nonlinear objects, where steps along the shortest path to the optimal variables are taken. Modeling the camera rotation and camera translation direction using Lie group theory and optimizing on the corresponding manifolds speeds up the optimization process.

All tracked points 307 between the keyframe 150 and the subsequent video frame 152 are provided as inputs to define the cost to be minimized during optimization. This means that the only variables being optimized are camera rotation (3 variables, 3-DOF) and camera translation direction (2 variables, 2-DOF) and all tracked points 307 are used to define the cost to be minimized during optimization.

The 5-DOF solver 311 can also comprise the RANSAC algorithm receiving as inputs the tracked points 307 between the keyframe 150 and the subsequent video frame 152. RANSAC can act as a wrapper around the 5-DOF nonlinear least squares solver. The RANSAC algorithm is effective at removing outlier points, which would render the final solution unusable.

In the present case, five tracked points 307 are randomly selected to compute the up-to-scale pose via nonlinear optimization. The 5-DOF solver 311 is configured to require that a minimum subset of five tracked points 307 be used to compute a solution using RANSAC. The number of inlier points found using this calculated up-to-scale pose is counted and this process is repeated for a fixed number of iterations. After this fixed number of iterations is reached, the outlier points are discarded and one final 5-DOF optimization is run using all of the inlier points to determine the up-to-scale camera pose 313.

The final output of the 5-DOF solver 311 can be an up-to-scale camera pose 313 (also referred to as a scaled pose). The up-to-scale camera pose 313 can then be provided as an input to a one degree of freedom (1-DOF) solver 315 to solve for a camera translation magnitude 317 in step 312.

The 1-DOF solver 315 can refer to at least one of: (i) a homography-based reprojection error minimization technique, (ii) a triangulated point-based reprojection error minimization technique, and (iii) a constant depth-based reprojection error minimization technique.

In some embodiments, the 1-DOF solver 315 can prioritize the homography-based reprojection error minimization technique over the triangulated point-based reprojection error minimization technique and the constant depth-based reprojection error minimization technique. In these embodiments, the 1-DOF solver 315 can also prioritize the triangulated point-based reprojection error minimization technique over the constant depth-based reprojection error minimization technique.

In other embodiments, the 1-DOF solver 315 can solve for the camera translation magnitude 317 using all three techniques and can select the camera translation magnitude 317 that minimizes reprojection error for all tracked points 307.

The 1-DOF solver 315 takes as inputs the up-to-scale camera pose 313 (the camera rotation and the camera translation direction) and assumes that such inputs are correct.

The homography-based reprojection error minimization technique can comprise another RANSAC-based nonlinear least squares solver that aims to optimize the variables camera translation magnitude 317 and ground plane normal to minimize the homography-based reprojection error of the tracked points 307.

In some embodiments, the homography-based reprojection error minimization technique can comprise the steps of selecting a minimum subset of tracked points from the plurality of tracked points 307 (e.g., a minimum of three tracked points 307) and constructing an Euclidean homography matrix based on the camera rotation matrix and the camera translation direction from the up-to-scale camera pose 313, a known camera height (which can be physically measured when mounting the camera 117 to the carrier vehicle 110), the camera translation magnitude 317, and a ground plane normal. The camera translation magnitude 317 can be a physical distance separating the camera 117 when the camera 117 captured the keyframe 150 and when the camera 117 captured the subsequent video frame 152 (see, e.g., FIG. 7). The ground plane normal can be a unit vector pointing up out of the ground and orthogonal to the ground plane.ca The homography-based reprojection error minimization technique can further comprise the steps of projecting the minimum subset of tracked points between the keyframe and the subsequent video frame using the Euclidean homography matrix constructed and using another RANSAC-based nonlinear least squares solver to solve for the camera translation magnitude 317 and the ground plane normal such that an angular error between an expected ground plane normal and a computed ground plane normal for each of the minimum subset of tracked points is below a predefined threshold of about five degrees.

As a more specific example, the full set of tracked points 307 can be first pruned by selecting only tracked points 307 with a y-value greater than a threshold (e.g., points near the bottom of the video frame where the road is visible). A RANSAC-based approach can be taken that requires a minimum of three points per iteration. During the RANSAC iterations, a point is considered an inlier if the homography matrix transforms the point from one video frame to another and its transformed position is within a threshold of pixels from the original point match location. Outliers are then removed after each RANSAC iteration and the solution is smoothed via nonlinear optimization using all inlier points. The final output is a ground plane normal and a camera translation magnitude 317.

If the homography-based reprojection error minimization technique produces a camera translation magnitude 317 and ground plane normal where the angular error between the computed ground plane normal and the expected ground plane normal exceeds an angular error threshold (e.g., of 5 degrees), the 1-DOF solver 315 can then use the triangulated point-based reprojection error minimization technique to solve for the camera translation magnitude 317.

The triangulated point-based reprojection error minimization technique can be used if there are a sufficient number of triangulated points. For example, the triangulated point-based reprojection error minimization technique can be used if there are at least 10 to 20 triangulated points.

The triangulated point-based reprojection error minimization technique finds the camera translation magnitude 317 that minimizes reprojection error among all triangulated points via a nonlinear least squares solver in a consensus manner such that each triangulated point produces a solution for the camera translation magnitude 317 and keeping the solution that best minimizes reprojection error among all triangulated points.

Since there is only one variable involved (camera translation magnitude 317), the solution is obtained via a consensus format using each singular point to produce a solution and keeping the solution that best minimizes reprojection error among all points.

In some embodiments, the nonlinear least squares solver used is the Levenberg-Marquardt algorithm. The Levenberg-Marquardt algorithm can also be used as the nonlinear least squares solver for the 5-DOF solver 311 and the homography-based reprojection error minimization technique. The Levenberg-Marquardt algorithm computes error gradients to determine the adjustments needed to the variable being optimized that will reduce the error to zero.

If there is not a sufficient number of triangulated points or if the number of triangulated points is below a predetermined point threshold (e.g., ten triangulated points), the 1-DOF solver 315 can then use the constant depth-based reprojection error minimization technique to compute the camera translation magnitude 317.

Figure 8A:
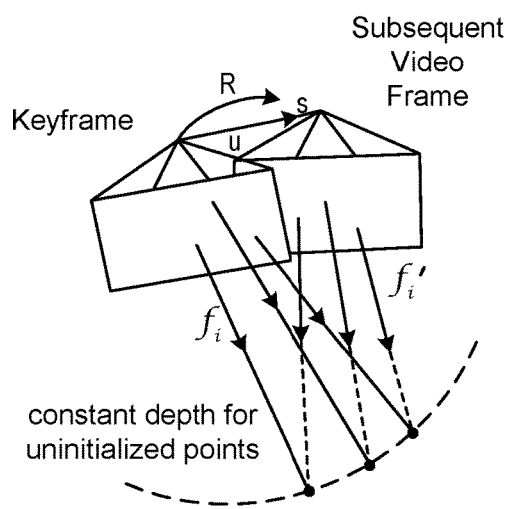
FIG. 8A illustrates a scenario where all points have a constant assumed depth.

The constant depth-based reprojection error minimization technique assumes that all tracked points 307 are at a constant fixed depth (e.g., an average scene depth) and determines the camera translation magnitude 317 that minimizes reprojection error for the tracked points 307 (see, e.g., FIG. 8A).

Once the 1-DOF solver 315 has computed the camera translation magnitude 317 based on the up-to-scale camera pose 313 received from the 5-DOF solver 311 using at least one of: (i) the homography-based reprojection error minimization technique, (ii) the triangulated point-based reprojection error minimization technique, and (iii) the constant depth-based reprojection error minimization technique, the method 300 can comprise combining the up-to-scale camera pose 313 with the camera translation magnitude 317 to obtain a full camera pose 319. The full camera pose 319 can be determined with respect to the keyframe 150.

The full camera pose 319 can comprise the camera rotation, the camera translation direction, and the camera translation magnitude 317 between the keyframe 150 and the subsequent video frame 152. That is, the full camera pose 319 conveys information concerning the change in position and orientation of the camera between when the keyframe 150 was captured and when the subsequent video frame 152 was captured.

FIG. 3 illustrates that the feature/point detection step 304, the feature/point tracking step 306, the image masking step 308, the 5-DOF solver 311, and the 1-DOF solver 315 can all be considered part of a visual odometry algorithm.

The method 300 can further comprise triangulating at least some of the tracked points 307 using a triangulation algorithm 321 and taking into account the full camera pose 319 in step 314. The triangulation algorithm 321 can produce a plurality of triangulated points 323. The tracked points 307 can be triangulated when they have gained sufficient angular disparity (see, e.g., FIG. 9). This means that the camera 117 has translated such that a disparity angle formed by the initial and latest point observation rays exceeds a threshold angle.

In some embodiments, the threshold angle can be at least 3 degrees. For example, the threshold angle can be approximately 90 degrees. Waiting for a sufficient angular disparity before proceeding with the point triangulation step decreases the likelihood of prematurely marking points as outliers due to noise in the point matches. This can increase the longevity of feature points tracks which can provide better scale consistency.

In some embodiments, the triangulation algorithm 321 can be the Direct Linear Transformation (DLT) algorithm. The triangulation algorithm 321 takes as inputs the full camera pose 319 and point measurements of the tracked point 307 in the keyframe 150 and the subsequent video frame 152.

In some embodiments, the triangulated points 323 produced by the triangulation algorithm 321 can be fed back into the 1-DOF solver 315 to be used as part of the triangulated point-based reprojection error minimization technique.

In some embodiments, the method 300 can comprise triangulating all tracked points 307 detected in the keyframe 150 including those previously marked as outliers during an earlier part of the method 300. After computing the full camera pose 319, all tracked points 307, including outlier image points or tracked points 307 previously determined to be outlier points, can be triangulated using the triangulation algorithm 321 and taking into account the full camera pose 319. The triangulated instance of the outlier points (the triangulated outlier points) can be projected back into the subsequent video frame 152 using their latest calculated depths and the full camera pose 319. A smaller pyramidal optical flow window (e.g., a smaller KLT window) with no additional pyramid levels can be used to refine the point location of the outlier point. The outlier image point can then be added back into the inlier set if its Sampson error is within a preset threshold. The purpose for doing this is to use the now known full camera pose 319 and point depths obtained from the triangulation step to predict where the outlier image point will be in the subsequent video frame 152 and refine the location of the outlier image point using the KLT optical flow algorithm. Only one pyramid level of the KLT optical flow algorithm is used (meaning the KLT optimization is run at full image resolution) to obtain a more optical point location. A Sampson error check is then made to determine if the new point location is on or close to its epipolar line (to make sure the geometry makes sense). This process helps recover potential outlier image points and adds these points to the inlier set. This increases the longevity of feature tracks, thereby improving scale estimation consistency.

The method 300 can also comprise generating a local map 325 and a global map 327 (see, e.g., FIG. 10) based on the triangulated points 323 in step 316. The local map 325 can be a three-dimensional (3D) point cloud generated from the two-dimensional (2D) tracked points 307 after such points have been triangulated. The local map 325 can be the set of triangulated points still within view of the camera 117 of the edge device 102.

A global map 327 can also be generated that shows 3D point clouds of all triangulated points that were previously within view of the camera 117 as the carrier vehicle 110 carrying the edge device 102 drives around an area (e.g., the carrier vehicle 110 traverses its daily route).

The method 300 can further comprise converting the full camera pose 319 to a full vehicle pose 329 of the carrier vehicle 110 in step 318. The full camera pose 319 can be converted to the full vehicle pose 329 based on a known relationship (e.g., a spatial relationship) between the full camera pose 319 and the full vehicle pose 329. For example, the positioning of the camera 117 within the carrier vehicle 110 and the positioning of the camera 117 relative to the rest of the carrier vehicle 110 can be known and calibrated beforehand.

The full vehicle pose 329 can be determined with respect to the keyframe 150. The full vehicle pose 329 can be determined from the full camera pose 319 which is computed based on visual odometry measurements made using the keyframe 150 and the subsequent video frame 152.

The method 300 can also comprise determining a vehicle position and motion of the carrier vehicle 110 based on positioning data (e.g., the positioning data 130) obtained from the positioning unit 118 of the edge device 102 in step 320. The motion of the carrier vehicle 110 can comprise a velocity and acceleration of the carrier vehicle 110.

In some embodiments, the positioning unit 118 of the edge device 102 can be a GNSS receiver (e.g., a GPS receiver). The positioning data (e.g., the positioning data 130) can comprise GNSS data such as a latitude and longitude (in degrees), an altitude (in meters above sea level), and velocity (in North, East coordinates in m/s) of the carrier vehicle 110. The velocity can comprise a horizontal forward velocity and a downward velocity. All such velocity data can be obtained from the GNSS receiver.

An acceleration (horizontal forward acceleration) of the carrier vehicle 110 can also be calculated using velocity data obtained from the GNSS receiver. The vehicle heading can also be calculated based on the velocity data obtained from the GNSS.

The method 300 can further comprise providing the full vehicle pose 329 with respect to the keyframe 150 obtained from the visual odometry algorithm and the vehicle position and motion determined from the positioning unit 118 to a filter 331 running on the edge device 102 to obtain a fused vehicle pose and motion 333 in step 322.

In some embodiments, the filter 331 can be an extended Kalman filter 331. The extended Kalman filter 331 can comprise a propagation step and an update step. When a new measurement is received (either from the GNSS or the visual odometry algorithm), the fused pose and motion 333 can be propagated forward in time using a constant acceleration bicycle model. The acceleration is assumed to be constant to better handle acceleration and deceleration events.

The fused pose and motion 333 can comprise a latitude of the carrier vehicle 110, a longitude of the carrier vehicle 110, an altitude of the carrier vehicle 110, a velocity of the carrier vehicle 110, an acceleration of the carrier vehicle 110 calculated from the velocity data, vehicle rotation with respect to the keyframe 150, a vehicle translation with respect to the keyframe 150, and a vehicle heading with respect to the keyframe 150.

The longitude, latitude, and altitude coordinates can be converted to North, East, and Down (NED) coordinates when provided to the filter 331.

The filter 331 (e.g., extended Kalman filter) can fuse together the vehicle position and motion data obtained from the positioning unit 118 and the full vehicle pose 329 computed using the visual odometry algorithm. While visual odometry measurements and GNSS data each have their own individual issues, these measurements and data complement each other well when combined. For example, data obtained from the GNSS receiver can provide absolute measurements of position and velocity but such receivers often lose their signal when the carrier vehicle 110 is traveling through urban environments obstructed by structures such as tall buildings, tunnels, overpasses, etc. Also, for example, while visual odometry measurements work well in urban environments, such measurements cannot provide information concerning absolute position or velocity. Combining or fusing the two improves overall navigation accuracy and reliability.

Figure 4A:
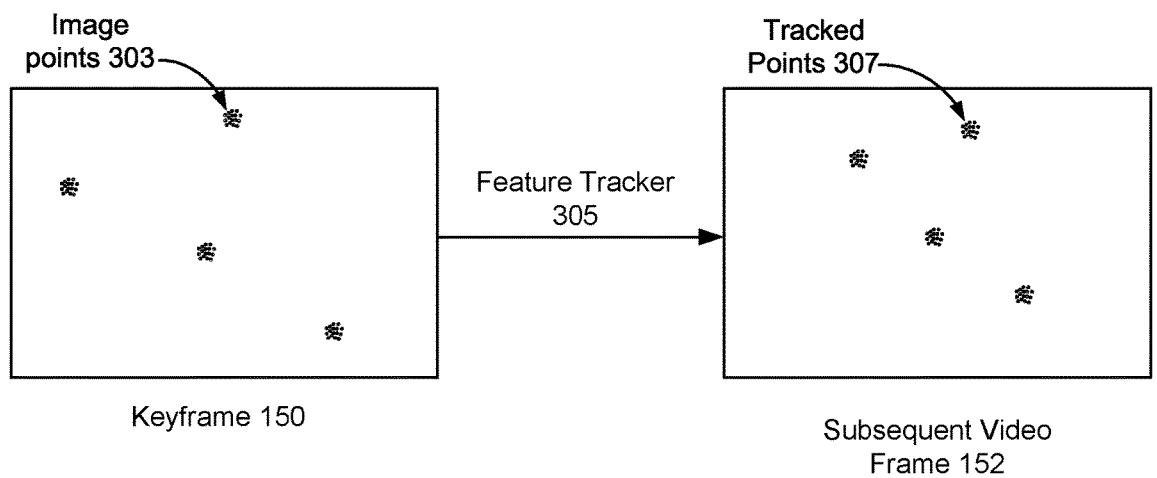
FIG. 4A illustrates that a feature tracker can track image points or features from a keyframe to a subsequent video frame.

FIG. 4A illustrates that a feature tracker 305 running on the edge device 102 can be used to track image points 303 from a keyframe 150 (also known as "keyframe points") to a subsequent video frame 152. The image points 303 tracked can be referred to as tracked points 307.

In some embodiments, the tracked points 307 can comprise point patches or points that define one or more features in the keyframe 150.

In some embodiments, the edge device 102 can feed subsequent video frames 152 to the feature tracker 305 and the feature tracker 305 can find point patches in the subsequent video frame 152 that most closely match or resemble the point patches in the keyframe 150.

In some embodiments, the feature tracker 305 can be a pyramidal optical flow algorithm. In certain embodiments, the pyramidal optical flow algorithm can be run only in the forward direction.

As a more specific example, the feature tracker 305 can be the Kanade-Lucas-Tomasi (KLT) pyramidal optical flow algorithm.

Figure 4B:
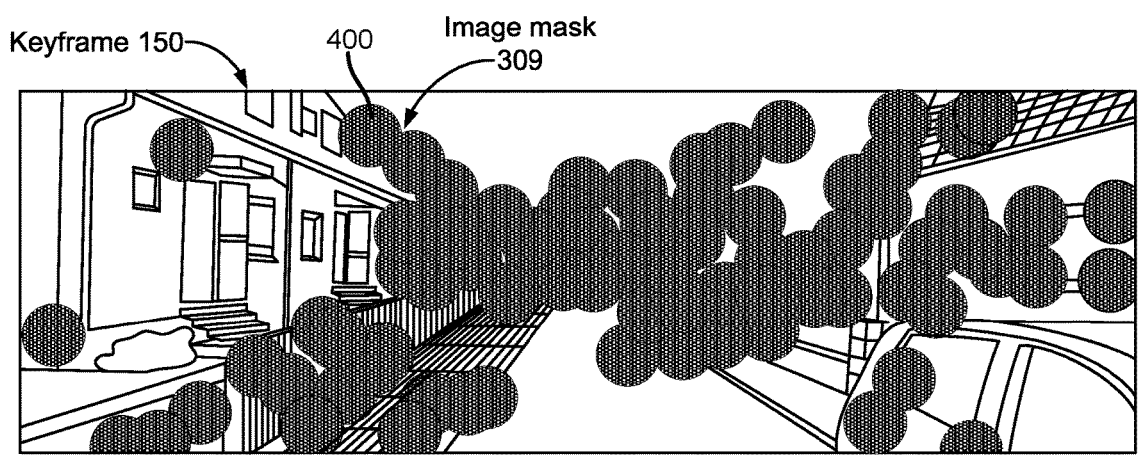
FIG. 4B illustrates an example of a keyframe masked by a plurality of image masks.

FIG. 4B illustrates an example of a keyframe 150 masked by a plurality of image masks 309. In the example embodiment shown in FIG. 4B, the image masks 309 are filled circles 400 centered around the tracked points 307. In this embodiment, the radius of the filled circle 400 can be a minimum point separation distance or parameter.

The image masks 309 tell the feature detector 301 (see, e.g., FIG. 3) where image points 303 can or cannot be detected. Since it is a waste of computational resources to detect image points 303 near other previously detected image points 303, the image masks 309 set a minimum separation distance to ensure a good distribution of image points 303 are detected.

Although FIG. 4B illustrates a visual representation of the image masks 309, it should be understood by one of ordinary skill in the art that the image masks 309 can be applied by the processors of the edge device 102 without the image masks 309 being visualized.

In other embodiments, a bucketing procedure can also be used or used in lieu of the image masks 309 to maintain a more uniform distribution of tracked points 307 or tracked features. As part of the bucketing procedure, the keyframe 150 can be divided into grids (e.g., a 100 pixel by 100 pixel grid) and the feature detector 301 can be configured to detect at most 10-20 features from each of these grids.

Figure 5:
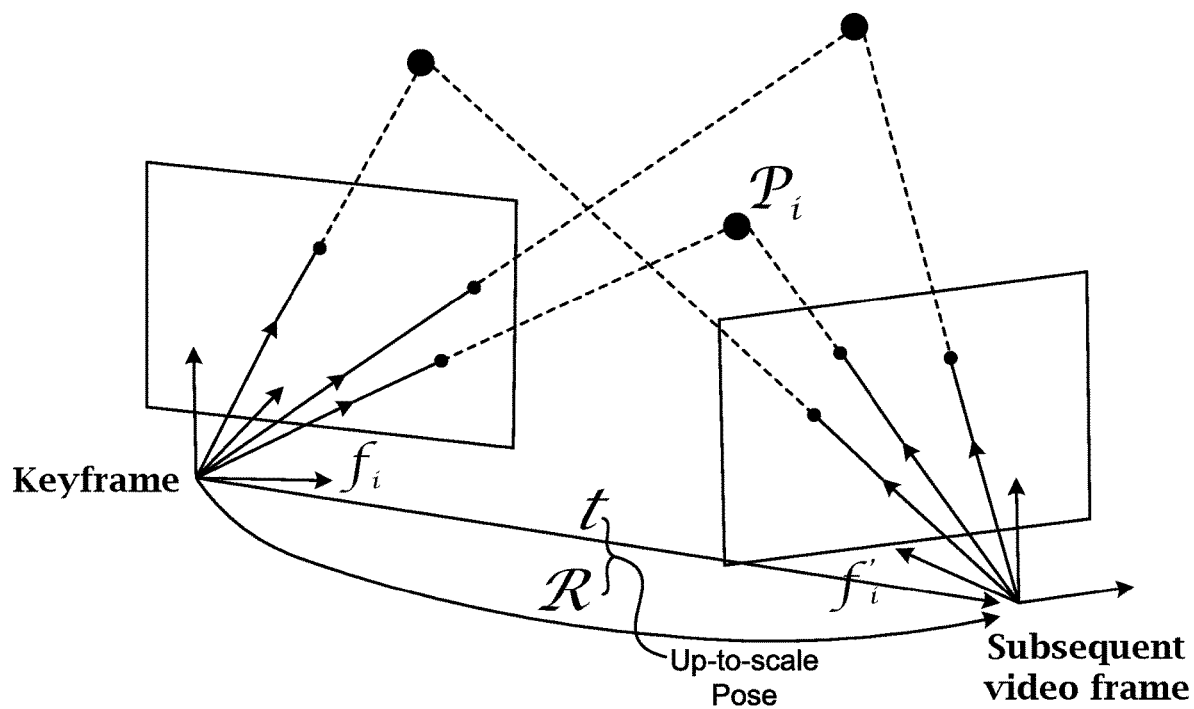
FIG. 5 illustrates an up-to-scale pose being calculated between a keyframe and a subsequent video frame.

FIG. 5 is a simplified illustration depicting an up-to-scale pose being calculated between the keyframe and a subsequent video frame. The up-to-scale pose can comprise a camera rotation matrix, R, and a camera translation direction, t. The translation direction, t, is a unit length vector. The up-to-scale pose can be calculated using a RANSAC-based nonlinear least squares solver with the camera rotation matrix and the camera translation direction as the two variables being optimized.

Figure 6:
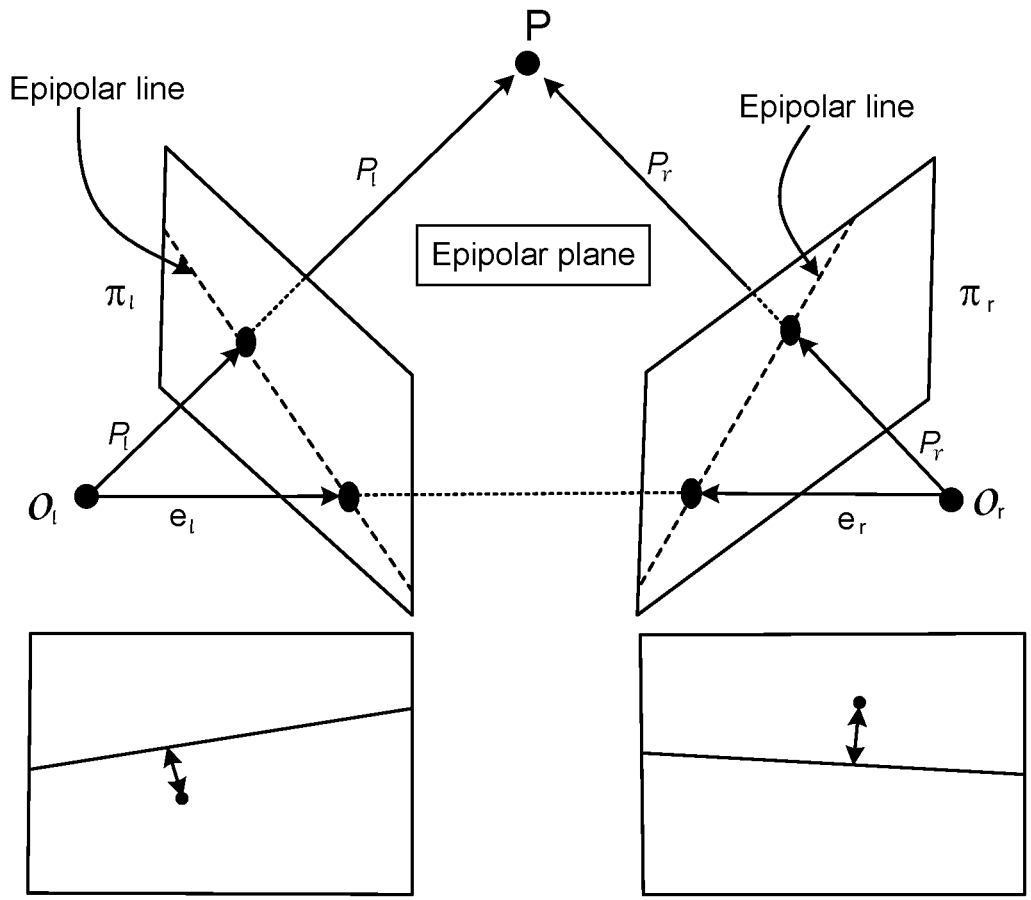
FIG. 6 illustrates two cameras observing a point and left and right camera images showing the measured point in each image as well as the distance to the epipolar line.

FIG. 6 is a simplified illustration depicting two cameras observing a point (P) and left and right camera images showing the measured point in each image as well as the distance to the epipolar line.

As previously discussed, the variables camera rotation matrix and camera translation direction are updated on their respective 3-DOF and 2-DOF manifolds. The cost being minimized is an epipolar error between the tracked point in the keyframe and the tracked point in the subsequent video frame. The RANSAC inlier criteria is a Sampson distance formulated in terms of a pixel distance from the epipolar line.

Figure 7:
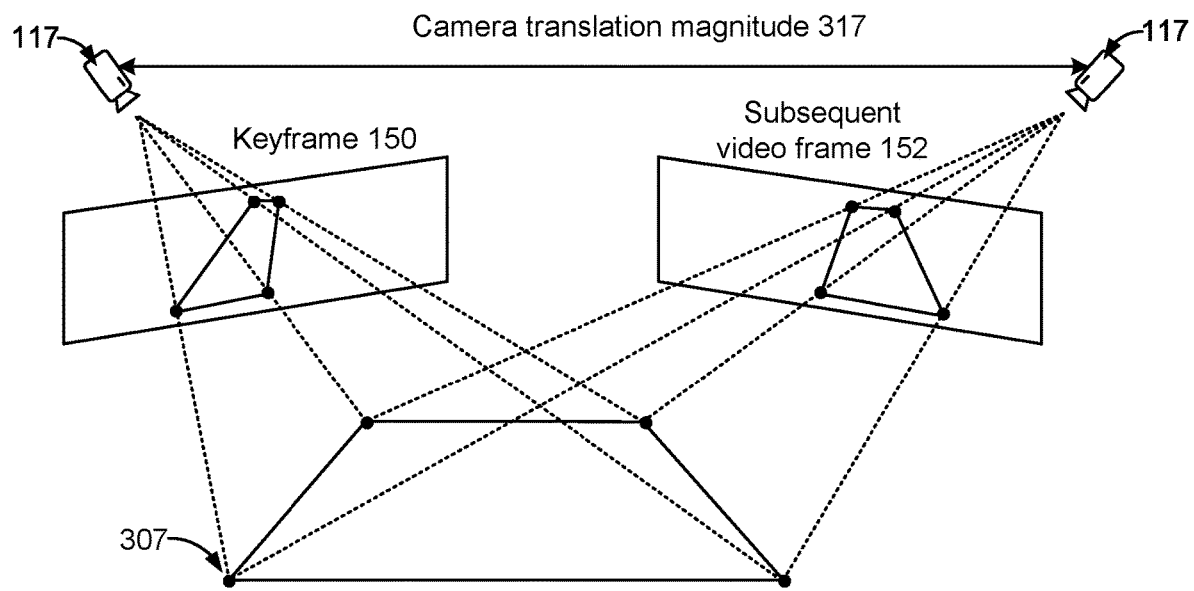
FIG. 7 illustrates a camera capturing a keyframe containing a plurality of tracked points and the same camera translated to a new location when capturing a subsequent video frame containing the same tracked points.

FIG. 7 is a simplified illustration depicting the camera 117 capturing a keyframe 150 containing a plurality of tracked points 307 and the same camera 117 translated to a new location when capturing a subsequent video frame 152 containing the same tracked points 307. As shown in FIG. 7, the camera translation magnitude 317 is a distance separating the camera 117 when it captured the keyframe 150 and the camera 117 at the new location when it captured the subsequent video frame 152.

Figure 8B:
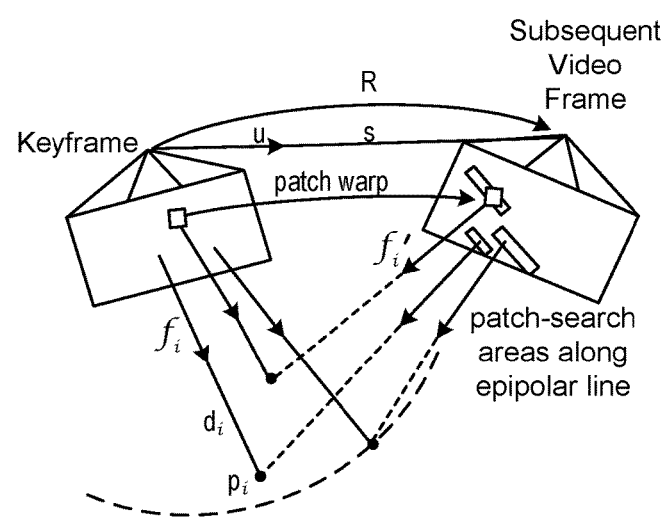
FIG. 8B illustrates a scenario where the depths of various points are known.

FIG. 8A illustrates a scenario where all points have a constant assumed depth. FIG. 8B illustrates a scenario where the depths of the various points are known. As previously discussed, the 1-DOF solver 315 (see, e.g., FIG. 3) can default to a constant depth-based reprojection error minimization technique to compute the camera translation magnitude 317. As part of this method, all points are assumed to have a constant fixed depth (e.g., a predefined depth or an average depth) to find the camera translation magnitude 317 that minimizes reprojection error.

Figure 9:
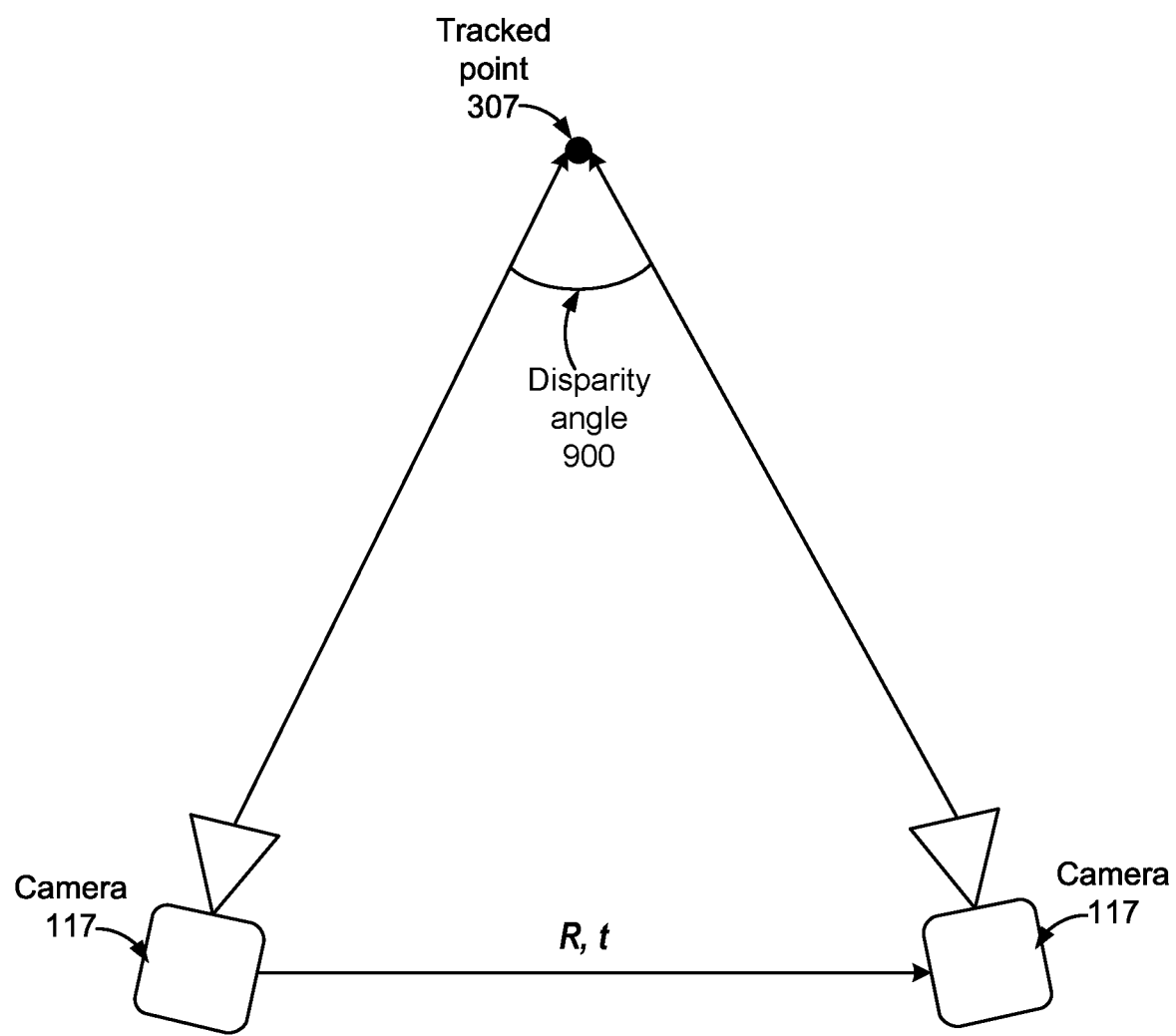
FIG. 9 illustrates that a tracked point can be triangulated when it has gained sufficient angular disparity.

FIG. 9 illustrates that a tracked point 307 can be triangulated when it has gained sufficient angular disparity. This means that the camera 117 has translated such that the disparity angle 900 formed by the initial and latest point observation rays exceeds a threshold angle. In some embodiments, the threshold angle can be at least 3 degrees. For example, the threshold angle can be approximately 90 degrees.

The disparity angle 900 is a function of camera translation only. Rotating the camera 117 in place does not change the disparity angle 900.

Figure 10:
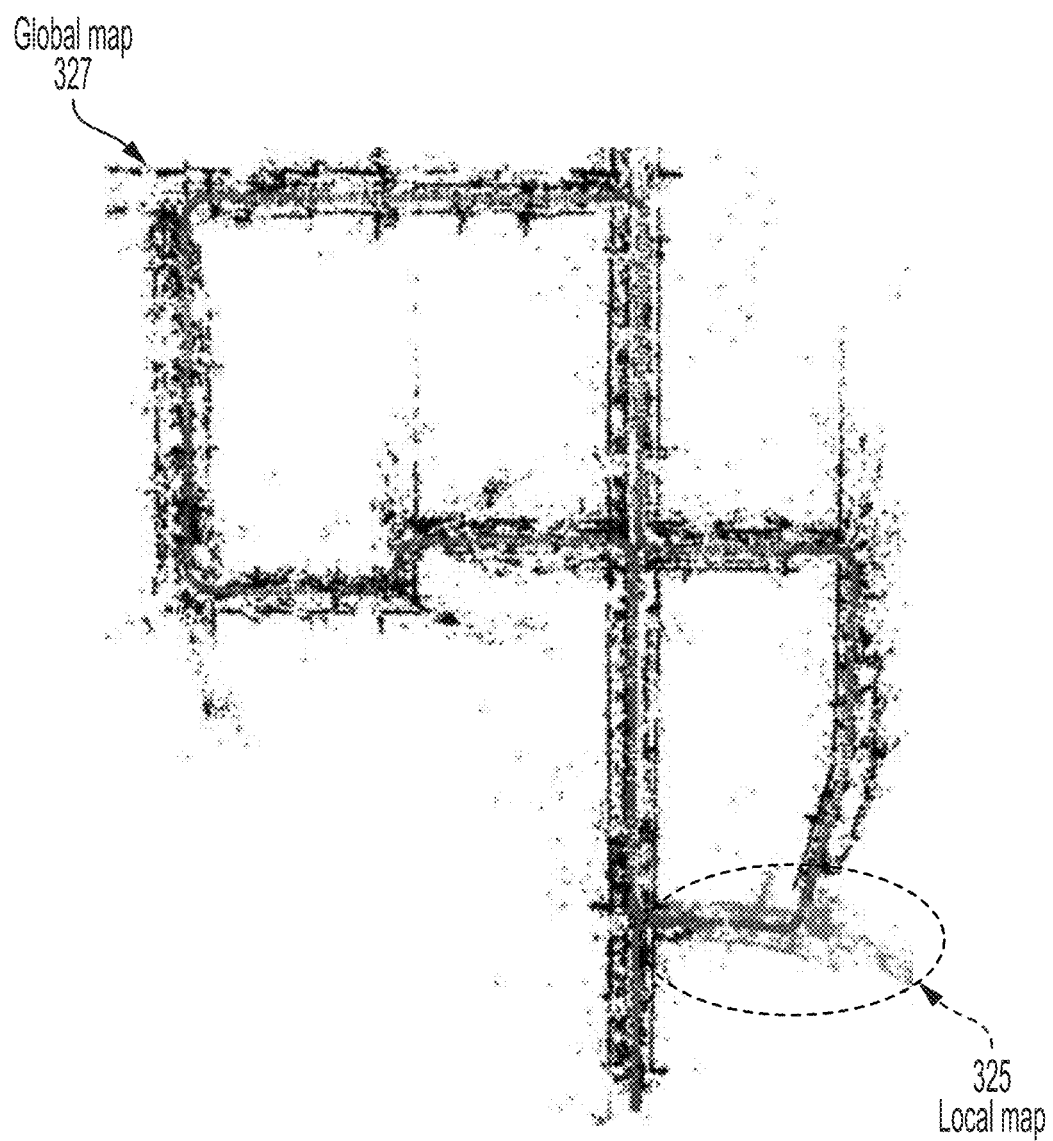
FIG. 10 illustrates one embodiment of a local map and a global map.

FIG. 10 illustrates one embodiment of a local map 325 and global map 327 that can be generated using the triangulated points 323. The local map 325 can refer to the set of triangulated points 323 still within view of the camera 117 of the edge device 102. The global map 327 can refer to all triangulated points 323 that were previously within view of the camera 117 and as the carrier vehicle 110 carrying the edge device 102 and the camera 117 drives around an area (e.g., the carrier vehicle 110 traverses its daily route).

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps or operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit, or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

Reference to the phrase "at least one of", when such phrase modifies a plurality of items or components (or an enumerated list of items or components) means any combination of one or more of those items or components. For example, the phrase "at least one of A, B, and C" means: (i) A; (ii) B; (iii) C; (iv) A, B, and C; (v) A and B; (vi) B and C; or (vii) A and C.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved.

Finally, terms of degree such as "substantially", "about" and "approximately" as used herein mean the specified value or the specified value and a reasonable amount of deviation from the specified value (e.g., a deviation of up to ±0.1%, ±1%, ±5%, or ±10%, as such variations are appropriate) such that the end result is not significantly or materially changed. For example, "about 1.0 cm" can be interpreted to mean "1.0 cm" or between "0.9 cm and 1.1 cm." When terms of degree such as "about" or "approximately" are used to refer to numbers or values that are part of a range, the term can be used to modify both the minimum and maximum numbers or values.

The term "engine" or "module" as used herein can refer to software, firmware, hardware, or a combination thereof. In the case of a software implementation, for instance, these may represent program code that performs specified tasks when executed on a processor (e.g., CPU, GPU, or processor cores therein). The program code can be stored in one or more computer-readable memory or storage devices. Any references to a function, task, or operation performed by an "engine" or "module" can also refer to one or more processors of a device or server programmed to execute such program code to perform the function, task, or operation.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:

1. A machine-based method of determining a pose and motion of a carrier vehicle, comprising:
   capturing a video of an external environment surrounding a carrier vehicle using a camera of an edge device coupled to the carrier vehicle, wherein the video comprises a plurality of video frames comprising a keyframe and a subsequent video frame captured after the keyframe;
   determining, using one or more processors of the edge device, a full vehicle pose of the carrier vehicle with respect to the keyframe based on visual odometry measurements, wherein the visual odometry measurements are made by:
   matching image points between the keyframe and the subsequent video frame to obtain a plurality of tracked points,
   providing the tracked points as inputs to a random sample consensus-based (RANSAC-based) nonlinear least squares solver to remove outliers and obtain an up-to-scale camera pose,
   determining a camera translation magnitude based on the up-to-scale camera pose using at least one of a homography-based reprojection error minimization technique, a triangulated point-based reprojection error minimization technique, and a constant depth-based reprojection error minimization technique,
   combining the up-to-scale camera pose and the camera translation magnitude to obtain a full camera pose, and
   converting the full camera pose to the full vehicle pose based on a known relationship between the full camera pose and the full vehicle pose;
   determining, using the one or more processors, a vehicle position and motion of the carrier vehicle based on positioning data obtained from a positioning unit of the edge device; and
   providing the full vehicle pose with respect to the keyframe obtained from the visual odometry measurements and the vehicle position and motion determined from the positioning data to a filter running on the edge device to obtain a fused vehicle pose and motion of the carrier vehicle, wherein the motion of the carrier vehicle comprises a velocity and acceleration of the carrier vehicle.

2. The method of claim 1, further comprising triangulating at least some of the tracked points using a triangulation algorithm and taking into account the full camera pose.

3. The method of claim 2, further comprising:
   projecting a triangulated instance of an outlier image point back into the subsequent video frame using its calculated depth and the full camera pose; and
   adding the outlier image point back into an inlier point set if a Sampson error of the outlier image point is within a preset threshold.

4. The method of claim 2, wherein the triangulated point-based reprojection error minimization technique further comprises:
  determining the camera translation magnitude that minimizes reprojection error among all triangulated points via a nonlinear least squares solver in a consensus manner such that each triangulated point produces a solution for the camera translation magnitude and keeping the solution that best minimizes reprojection error among all triangulated points.

5. The method of claim 1, wherein matching the image points between the keyframe and the subsequent video frame further comprises:
  masking the keyframe using image masks based on the tracked points;
  detecting new image points in image areas of the keyframe outside of the image masks using a feature detector algorithm;
  matching the new image points between the keyframe and the subsequent video frame to obtain a second set of tracked points; and
  repeating the detecting, matching, and masking steps until a total number of tracked points exceeds a threshold amount.

6. The method of claim 5, wherein masking the keyframe using the image masks further comprises centering a filled circle representing the image mask around a tracked point, wherein a radius of the filled circle is a minimum point separation parameter.

7. The method of claim 5, wherein the feature detector algorithm is the FAST feature detector algorithm.

8. The method of claim 1, wherein the image points between the keyframe and the subsequent video frame is matched using a pyramidal optical flow algorithm run in a forward direction.

9. The method of claim 1, wherein the RANSAC-based nonlinear least squares solver solves for the up-to-scale camera pose with respect to the keyframe using a camera rotation matrix and a camera translation direction as variables.

10. The method of claim 9, wherein the variables are updated on their respective three degrees of freedom (3-DOF) and two degrees of freedom (2-DOF) manifolds, wherein the cost being minimized is an epipolar error between the tracked point in the keyframe and the tracked point in the subsequent video frame, and wherein a RANSAC inlier criteria is a Sampson distance formulated in terms of a pixel distance from an epipolar line.

11. The method of claim 1, wherein the fused vehicle pose and motion further comprises a latitude of the carrier vehicle, a longitude of the carrier vehicle, an altitude of the carrier vehicle, a velocity of the carrier vehicle, an acceleration of the carrier vehicle, a vehicle rotation with respect to the keyframe, a vehicle translation with respect to the keyframe, and a vehicle heading with respect to keyframe.

12. The method of claim 1, wherein the homography-based reprojection error minimization technique further comprises:
  selecting a minimum subset of tracked points from the plurality of tracked points;
  constructing an Euclidean homography matrix based on a rotation matrix and a translation direction from the up-to-scale camera pose, a known camera height, the camera translation magnitude, and a ground plane normal;
  projecting the minimum subset of tracked points between the keyframe and the subsequent video frame using the Euclidean homography matrix constructed; and
  using another nonlinear least squares solver to solve for the camera translation magnitude and the ground plane normal such that an angular error between an expected ground plane normal and a computed ground plane normal for each of the minimum subset of tracked points is below a predefined threshold of about five degrees.

13. The method of claim 1, wherein the constant depth-based reprojection error minimization technique further comprises:
  assuming all tracked points are at a constant fixed depth; and
  determining the camera translation magnitude that minimizes reprojection error for the tracked points.

14. The method of claim 1, further comprising selecting a new instance of the keyframe in response to an amount of tracked points falling below a tracked points threshold or a camera rotation and translation exceeding a mean pixel threshold.

15. A device for determining a pose and motion of a carrier vehicle, comprising:
  a camera configured to capture a video of an external environment surrounding the carrier vehicle, wherein the device is coupled to the carrier vehicle, and wherein the video comprises a plurality of video frames comprising a keyframe and a subsequent video frame captured after the keyframe; and
  one or more processors programmed to:
  determine a full vehicle pose of the carrier vehicle with respect to the keyframe based on visual odometry measurements, wherein the visual odometry measurements are made by:
  matching image points between the keyframe and the subsequent video frame to obtain a plurality of tracked points,
  providing the tracked points as inputs to a random sample consensus-based (RANSAC-based) nonlinear least squares solver to remove outliers and obtain an up-to-scale camera pose,
  determining a camera translation magnitude based on the up-to-scale camera pose using at least one of a homography-based reprojection error minimization technique, a triangulated point-based reprojection error minimization technique, and a constant depth-based reprojection error minimization technique,
  combining the up-to-scale camera pose and the camera translation magnitude to obtain a full camera pose, and
  converting the full camera pose to the full vehicle pose based on a known relationship between the full camera pose and the full vehicle pose;
  determine a vehicle position and motion of the carrier vehicle based on positioning data obtained from a positioning unit of the device; and
  provide the full vehicle pose with respect to the keyframe obtained from the visual odometry measurements and the vehicle position and motion determined from the positioning data to a filter running on the device to obtain a fused vehicle pose and motion of the carrier vehicle, wherein the motion of the carrier vehicle comprises a velocity and acceleration of the carrier vehicle.

16. The device of claim 15, wherein the one or more processors are further programmed to triangulate at least some of the tracked points using a triangulation algorithm and taking into account the full camera pose.

17. The device of claim 16, wherein the one or more processors are further programmed to:
project a triangulated instance of an outlier image point back into the subsequent video frame using its calculated depth and the full camera pose; and
add the outlier image point back into an inlier point set if a Sampson error of the outlier image point is within a preset threshold.

18. The device of claim 16, wherein the one or more processors are further programmed to undertake the following steps as part of the triangulated point-based reprojection error minimization technique:
determine the camera translation magnitude that minimizes reprojection error among all triangulated points via a nonlinear least squares solver in a consensus manner such that each triangulated point produces a solution for the camera translation magnitude and keeping the solution that best minimizes reprojection error among all triangulated points.

19. The device of claim 15, wherein the one or more processors are further programmed to undertake the following steps to match the image points between the keyframe and the subsequent video frame:
mask the keyframe using image masks based on the tracked points;
detect new image points in image areas of the keyframe outside of the image masks;
match the new image points between the keyframe and the subsequent video frame to obtain a second set of tracked points; and
repeat the detecting, matching, and masking steps until a total number of tracked points exceeds a threshold amount.

20. The device of claim 15, wherein the one or more processors are further programmed to undertake the following steps as part of the homography-based reprojection error minimization technique:
select a minimum subset of tracked points from the plurality of tracked points;
construct an Euclidean homography matrix based on a rotation matrix and a translation direction from the up-to-scale camera pose, a known camera height, the camera translation magnitude, and a ground plane normal;
project the minimum subset of tracked points between the keyframe and the subsequent video frame using the Euclidean homography matrix constructed; and
use another nonlinear least squares solver to solve for the camera translation magnitude and the ground plane normal such that an angular error between an expected ground plane normal and a computed ground plane normal for each of the minimum subset of tracked points is below a predefined threshold of about five degrees.

21. The device of claim 15, wherein the one or more processors are further programmed to undertake the following steps as part of the constant depth-based reprojection error minimization technique:
assume all tracked points are at a constant fixed depth; and
determine the camera translation magnitude that minimizes reprojection error for the tracked points.

22. One or more non-transitory computer-readable media comprising instructions stored thereon, that when executed by one or more processors, cause the one or more processors to perform operations comprising:
determining a full vehicle pose of a carrier vehicle with respect to a keyframe of a video based on visual odometry measurements, wherein the video is captured by a camera of an edge device coupled to the carrier vehicle, wherein the wherein the visual odometry measurements are made by:
matching image points between the keyframe and a subsequent video frame to obtain a plurality of tracked points,
providing the tracked points as inputs to a random sample consensus-based (RANSAC-based) nonlinear least squares solver to remove outliers and obtain an up-to-scale camera pose,
determining a camera translation magnitude based on the up-to-scale camera pose using at least one of a homography-based reprojection error minimization technique, a triangulated point-based reprojection error minimization technique, and a constant depth-based reprojection error minimization technique,
combining the up-to-scale camera pose and the camera translation magnitude to obtain a full camera pose, and
converting the full camera pose to the full vehicle pose based on a known relationship between the full camera pose and the full vehicle pose;
determining a vehicle position and motion of the carrier vehicle based on positioning data obtained from a positioning unit of the edge device; and
providing the full vehicle pose with respect to the keyframe obtained from the visual odometry measurements and the vehicle position and motion determined from the positioning data to a filter running on the edge device to obtain a fused vehicle pose and motion of the carrier vehicle, wherein the motion of the carrier vehicle comprises a velocity and acceleration of the carrier vehicle.

23. The one or more non-transitory computer-readable media of claim 22, wherein the instructions further cause the one or more processors to perform operations comprising:
masking the keyframe using image masks based on the tracked points;
detecting new image points in image areas of the keyframe outside of the image masks;
matching the new image points between the keyframe and the subsequent video frame to obtain a second set of tracked points; and
repeating the detecting, matching, and masking steps until a total number of tracked points exceeds a threshold amount.

24. The one or more non-transitory computer-readable media of claim 23, wherein the instructions further cause the one or more processors to perform operations comprising masking the keyframe using the image masks by centering a filled circle representing the image mask around a tracked point, wherein a radius of the filled circle is a minimum point separation parameter.

25. The one or more non-transitory computer-readable media of claim 22, wherein the instructions further cause the one or more processors to perform the homography-based reprojection error minimization technique by:
selecting a minimum subset of tracked points from the plurality of tracked points;
constructing an Euclidean homography matrix based on a rotation matrix and a translation direction from the up-to-scale camera pose, a known camera height, the camera translation magnitude, and a ground plane normal;

projecting the minimum subset of tracked points between the keyframe and the subsequent video frame using the Euclidean homography matrix constructed; and using another nonlinear least squares solver to solve for the camera translation magnitude and the ground plane normal such that an angular error between an expected ground plane normal and a computed ground plane normal for each of the minimum subset of tracked points is below a predefined threshold of about five degrees.

26. The one or more non-transitory computer-readable media of claim 22, wherein the instructions further cause the one or more processors to perform the triangulated point-based reprojection error minimization technique by:

triangulating at least some of the tracked points using a triangulation algorithm and taking into account the full camera pose; and determining the camera translation magnitude that minimizes reprojection error among all triangulated points via a nonlinear least squares solver in a consensus manner such that each triangulated point produces a solution for the camera translation magnitude and keeping the solution that best minimizes reprojection error among all triangulated points.

27. The one or more non-transitory computer-readable media of claim 22, wherein the instructions further cause the one or more processors to perform the constant depth-based reprojection error minimization technique by:

assuming all tracked points are at a constant fixed depth; and determining the camera translation magnitude that minimizes reprojection error for the tracked points.

* * * * *